United States Patent [19]
Itoh

[11] Patent Number: 5,587,840
[45] Date of Patent: Dec. 24, 1996

[54] ZOOM LENS

[75] Inventor: Yoshinori Itoh, Kanagawa-ken, Japan

[73] Assignee: Canon Kabushiki Kaisha, Tokyo, Japan

[21] Appl. No.: 505,911

[22] Filed: Jul. 24, 1995

[30] Foreign Application Priority Data

Jul. 29, 1994 [JP] Japan .................................. 6-178503
Jun. 29, 1995 [JP] Japan .................................. 7-163671
Jun. 29, 1995 [JP] Japan .................................. 7-163672

[51] Int. Cl.$^6$ ............................................ G02B 15/14
[52] U.S. Cl. ........................................ 359/686; 359/685
[58] Field of Search .................................... 359/686, 685

[56] References Cited

U.S. PATENT DOCUMENTS

| | | |
|---|---|---|
| 4,756,609 | 7/1988 | Estelle . |
| 4,787,718 | 11/1988 | Cho . |
| 5,111,338 | 5/1992 | Nakayama . |
| 5,184,251 | 2/1993 | Tsuchida et al. .................. 359/686 |
| 5,270,865 | 12/1993 | Kikuchi et al. . |
| 5,274,504 | 12/1993 | Itoh . |
| 5,365,376 | 11/1994 | Itoh . |
| 5,493,447 | 2/1996 | Ohtake ............................. 359/686 |

FOREIGN PATENT DOCUMENTS

| | | |
|---|---|---|
| 272316 | 3/1990 | Japan . |
| 3249614 | 11/1991 | Japan . |
| 3282409 | 12/1991 | Japan . |
| 415610 | 1/1992 | Japan . |
| 437810 | 2/1992 | Japan . |
| 476511 | 3/1992 | Japan . |
| 4237009 | 8/1992 | Japan . |

*Primary Examiner*—Bruce C. Anderson
*Attorney, Agent, or Firm*—Fitzpatrick, Cella, Harper & Scinto

[57] ABSTRACT

A zoom lens comprising, from front to rear, a first lens unit of negative refractive power, a second lens unit of positive refractive power, a third lens unit of positive refractive power and a fourth lens unit of negative refractive power, totaling four lens units, wherein, when zooming from the wide-angle end to the telephoto end, the lens units move axially in such relation that the air separation between the first lens unit and the second lens unit increases, the air separation between the second lens unit and the third lens unit increases and the air separation between the third lens unit and the fourth lens unit decreases.

32 Claims, 29 Drawing Sheets

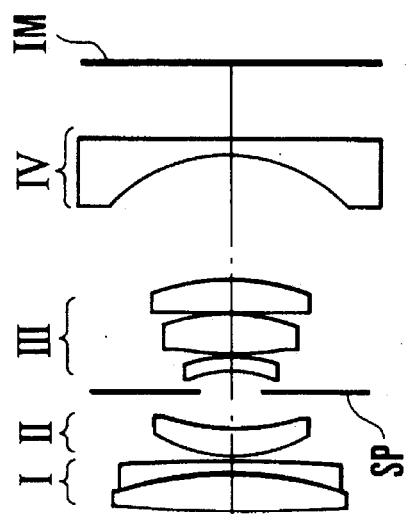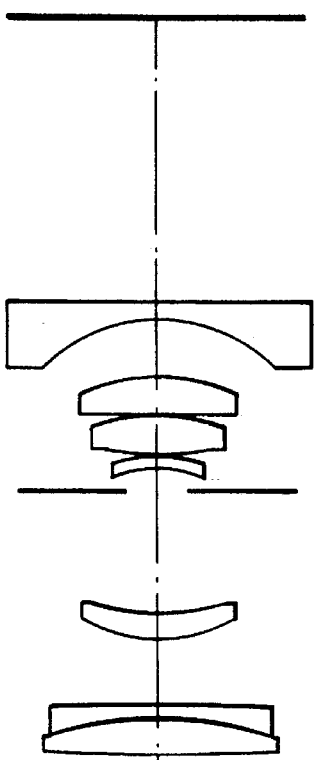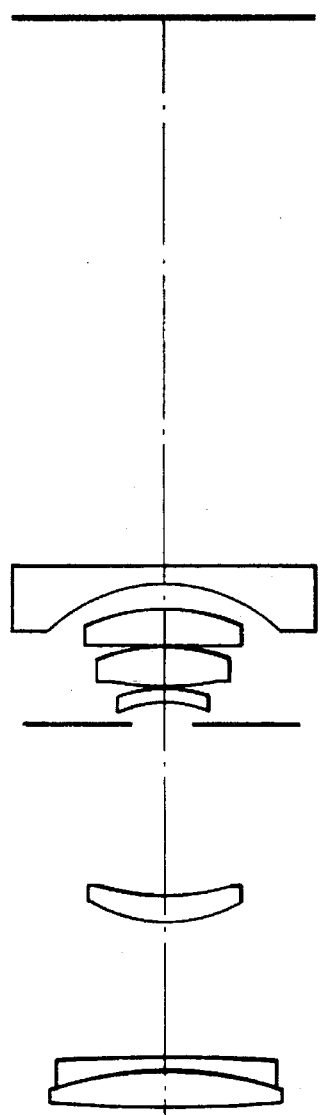
FIG. 2(A)
FIG. 2(B)
FIG. 2(C)

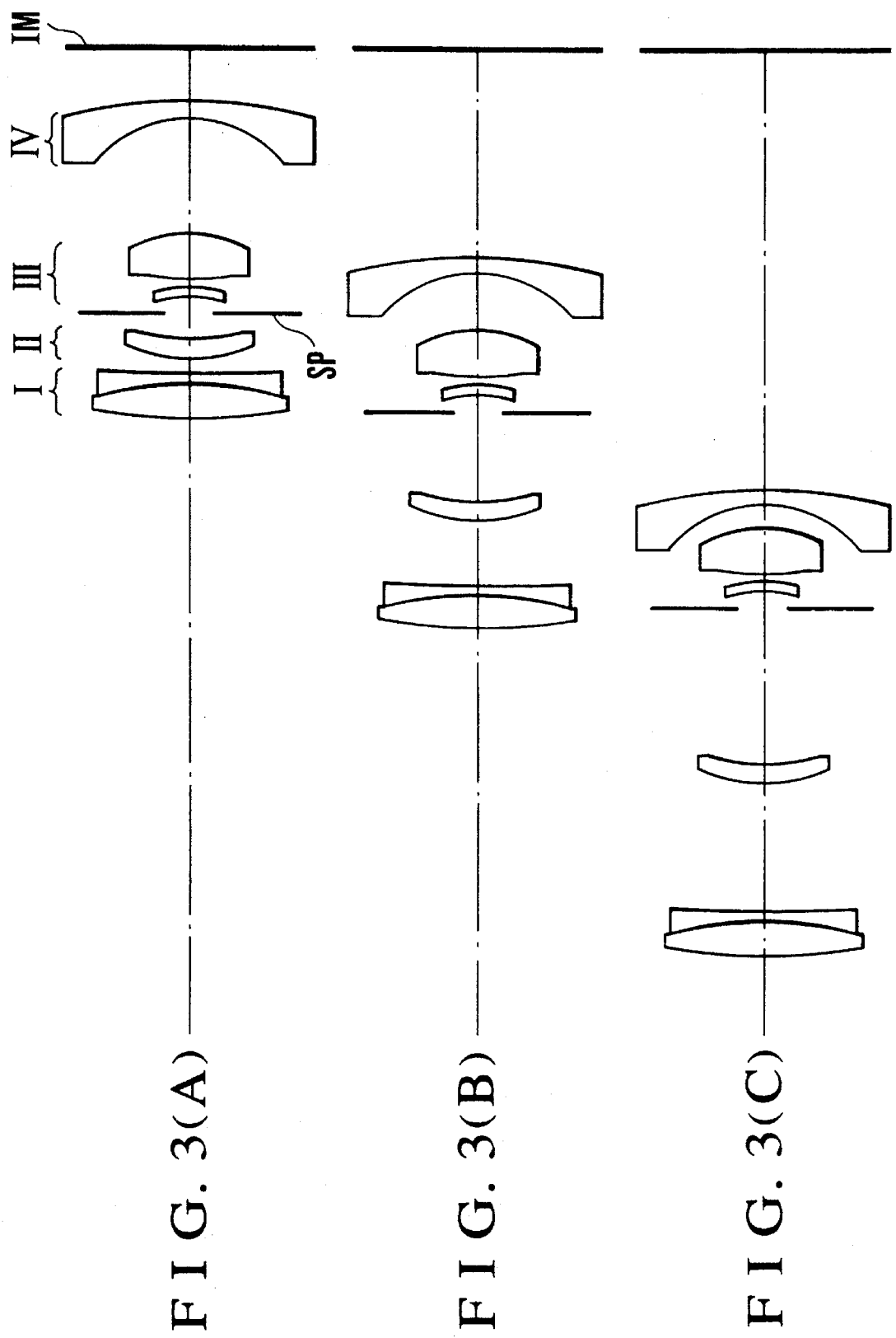
F I G. 3(A)
F I G. 3(B)
F I G. 3(C)

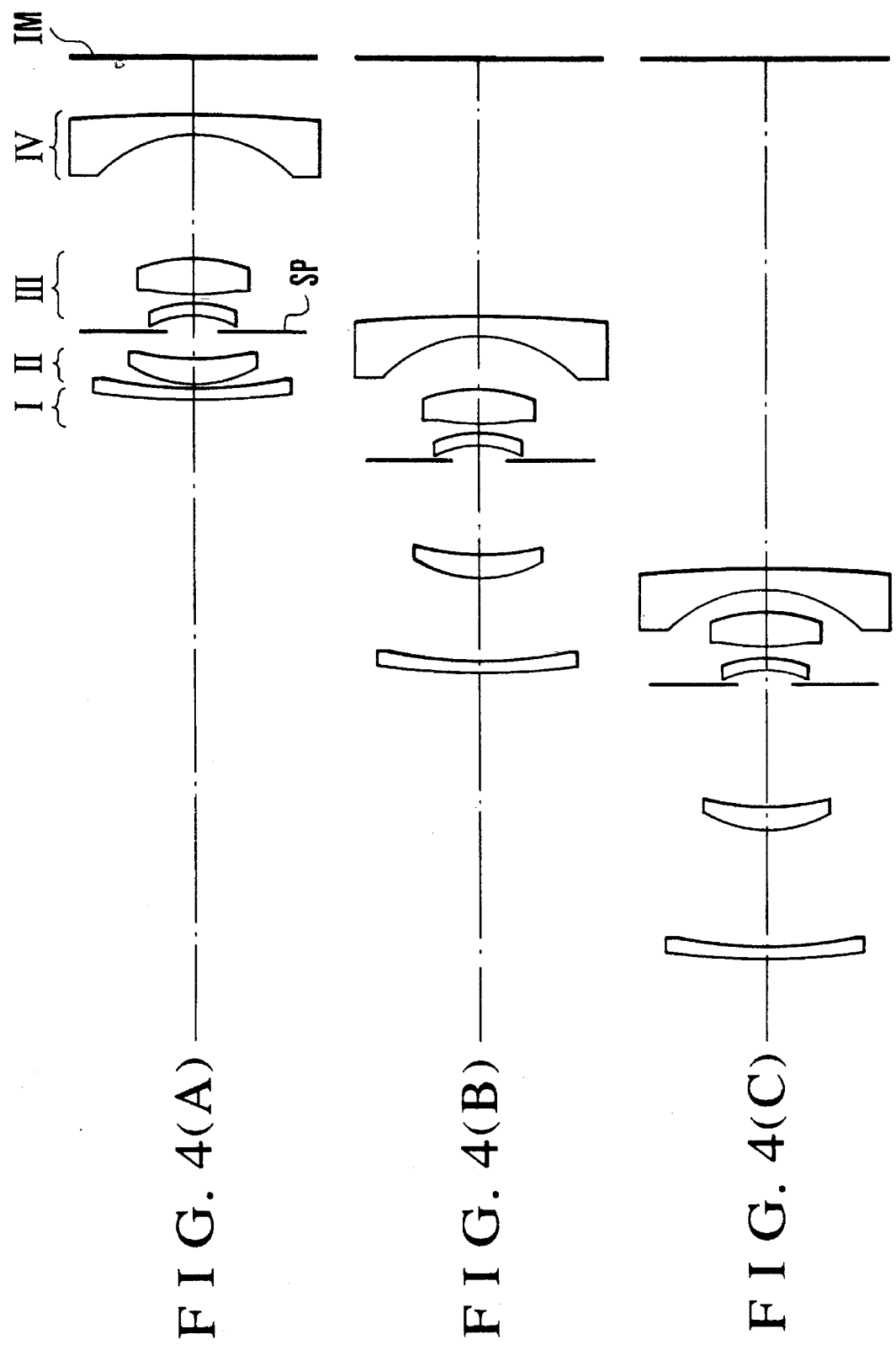

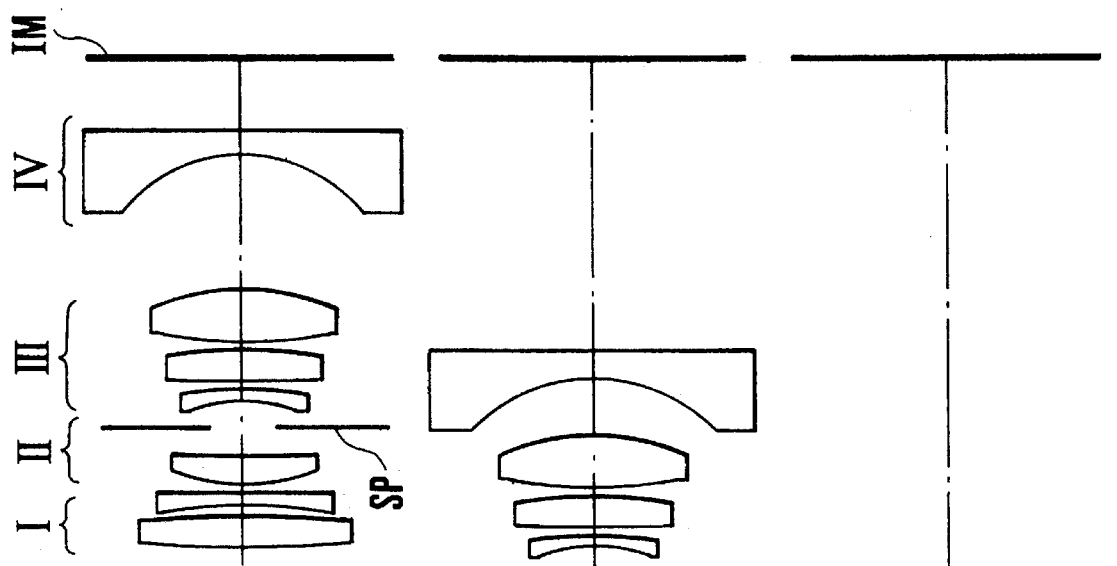
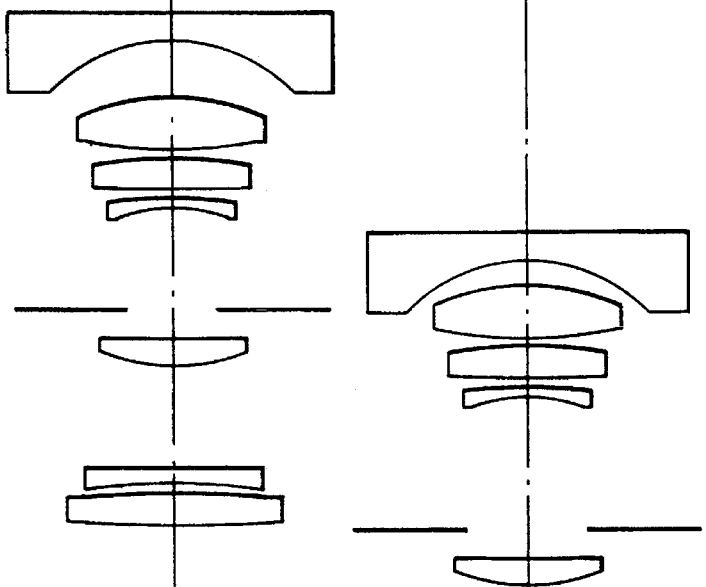
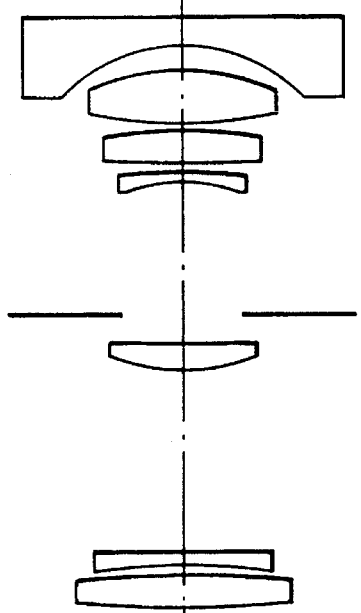
FIG. 13(A)
FIG. 13(B)
FIG. 13(C)

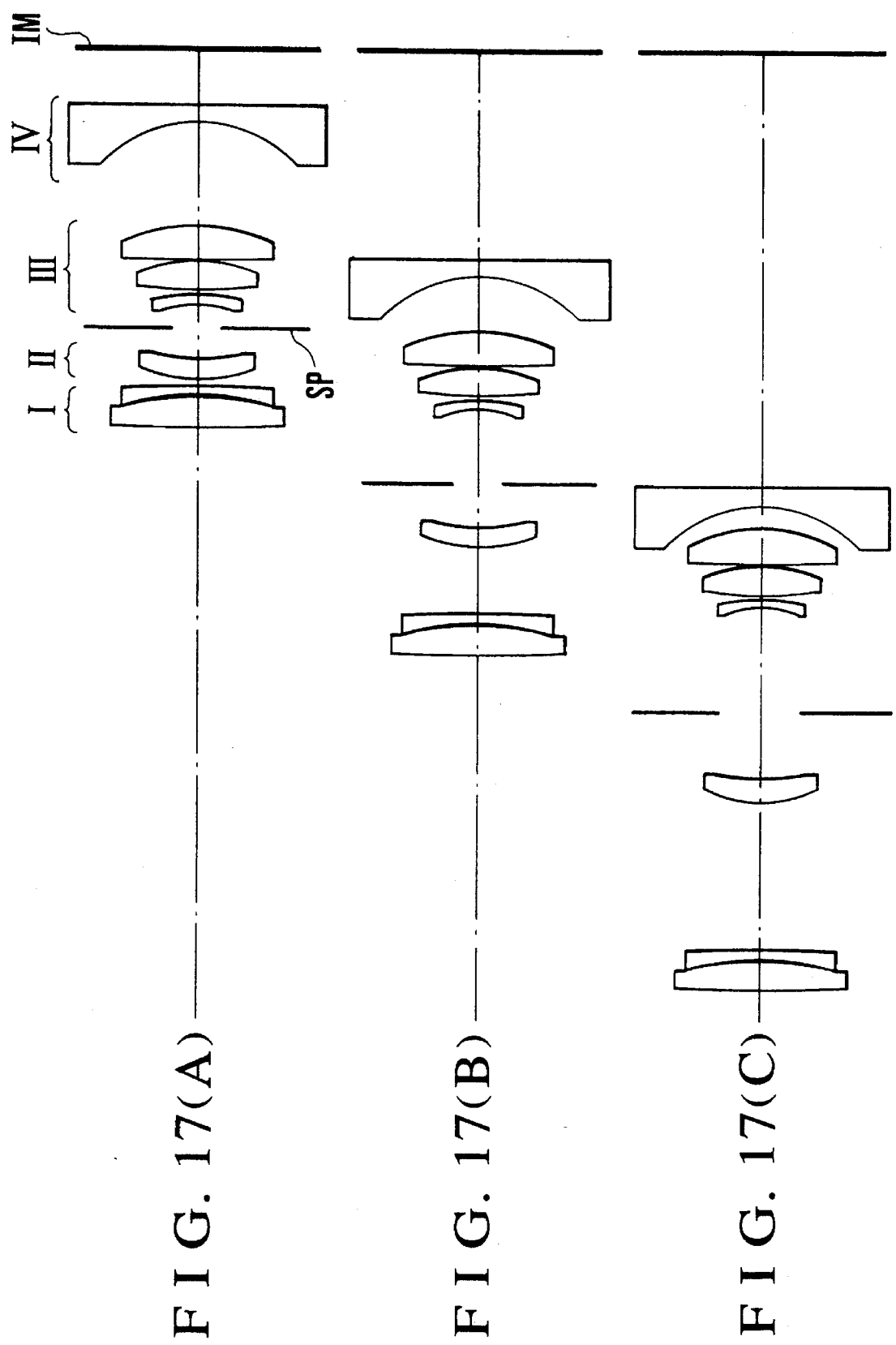
F I G. 17(A)  F I G. 17(B)  F I G. 17(C)

ZOOM LENS

BACKGROUND OF THE INVENTION

1. Field of the Invention

This invention relates to high range, wide-angle zoom lenses of compact form suited to leaf shutter cameras or video cameras and, more particularly, to zoom lenses for photography which are excellent in portability as the angle of field is increased while shortening the total length of the entire system (or the distance from the front vertex to the image plane).

2. Description of the Related Art

Recently, in the field of art of leaf shutter cameras, or video cameras, the trend of improving the compact form of the camera housing has prevailed. Along with this came a growing demand for the zoom lens of the compact form which is improved in respect to the total length of the entire system.

Particularly for the leaf shutter camera, owing to the achievement of a great advance of peripheral techniques such as the electric circuit of driving the zoom actuator and due to other reasons, the minimization of the size of the camera is ever improving. The photographic lens which such a camera will be equipped with, is required not only to have a high zoom ratio, but also to get a compact form.

In the prior art, the zoom lenses for the leaf shutter cameras are made up using two components of positive and negative refractive powers. That is to say, the so-called 2-component type of zoom lenses is the mainstream type. This 2-component zoom lens has a simple configuration and is quick and easy to operate, as the moving mechanism is simple in the structure of construction. Therefore, it is amenable to the technique of even more reducing the size of the camera. Another merit is that the production cost is comparatively low.

However, the function of varying the focal length has to be laid on only one component. The zoom ratio is, therefore, limited to the order of 1.6 to 2 or thereabout. The much desired increase of the zoom ratio invites a rapid increase of the bulk and size of the entire lens system. At the same time it becomes difficult to maintain high optical performance.

With the 2-component zoom lens as basis concepts, the first component may be divided to two parts whose refractive powers are both positive, thus making up the entire system from three components of positive, positive and negative refractive powers, so that a great increase of the zoom ratio is aimed at. Such a 3-component zoom lens is proposed in, for example, Japanese Laid-Open Patent Applications Nos. Hei 3-282409, Hei 4-37810 and Hei 4-76511.

However, if the artisan attempts to employ this configuration to realize as wide angle a zoom lens as, for example, 35° or more in semi-angle, it will result that the entrance pupil varies in position to a large extent with zooming. Because of this, the much desired increase of the zoom ratio cannot be achieved without causing rapid increase of the difficulty of suppressing the variation of aberrations with zooming.

Besides these, Japanese Laid-Open Patent Applications Nos. Hei 2-72316 and Hei 3-249614, for example, have made the previous proposal for using multi-component technique in increasing the semi-angle at the wide-angle end to about 38° and the zoom ratio to about 3.5 at once.

However, these zoom lenses have become larger in both the diameter of the front members and the total length of the entire system. So, they are not always satisfactory enough as a photographic lens for use in the compact camera.

Particularly in application to the camera of the type using the external finder, a problem arises in that when zooming to the wide-angle end, the lens barrel shuts off in part the finder field of view. As a result, another problem even arises in that serious limitations must be put on the finder arrangement and the layout of the camera.

In the meantime, the conventional examples of zoom lenses having four components of minus-plus-plus-minus power arrangement are disclosed in U.S. Pat. Nos. 4,787,718, 4,756,609, 5,111,338, 5,270,865 and 5,274,504 and Japanese Laid-Open Patent Applications Nos. Hei 4-15610 and Hei 4-237009. Any of these moves the first and second components in such a way that their separation decreases when zooming from the wide-angle end to the telephoto end.

With this, the U.S. Pat. No. 4,787,718 takes zoom ratio at 2 or thereabout. The U.S. Pat. Nos. 4,756,609, 5,270,865 and 5,274,504 and Japanese Laid-Open Patent Application No. Hei 4-15610, though having given a zoom ratio of 3 or so to their lens systems, are insufficient in increasing the angle of field.

In the U.S. Pat. No. 5,111,338 and Japanese Laid-Open Patent Application No. Hei 4-237009, the angular field and the zoom ratio have been made wide enough and high enough, but the total number of constituent lenses is very large. Moreover, the front members have got as large a diameter as is not suited to actual use.

In general, the zoom lenses have a feature that the stronger the refractive power of each of the components is made, the shorter each of the required movements of the zoom components for the equivalent range becomes, thus making it possible to simultaneously fulfill the requirements of increasing the zoom ratio and of shortening the total length of the entire system. However, the use of a simple technique by increasing the refractive power of each of the components leads to an increase in the range of variation of aberrations with zooming. Particularly for a case that the zoom ratio and the angle of field are to increase simultaneously, the problem of maintaining good stability of high optical performance throughout the extended zooming range becomes very difficult to solve.

SUMMARY OF THE INVENTION

The present invention has its subject to widen the image angle at the wide-angle end, while still permitting realization of good correction of aberrations and at the same time to increase the zoom ratio, while still permitting further improvements of the compact form of the entire system to be achieved. Incidentally, what are attained by numerical examples to be described later are zoom lenses whose total angular field coverage is 73.5° or so and whose zoom ratio is 3.5 or so.

Concomitant subjects to that described above are (i) to make a good compromise between the increase of the zoom ratio and the correction of aberrations, (ii) to maintain good stability of aberration correction throughout the entire focusing range, (iii) to have, despite reduction of the number of constituent lenses in each lens unit, to retain good correction of aberrations, (iv) to shorten the total length of the optics for the wide-angle end, (v) to make it easier to correct aberrations in the middle region of the zooming range, (vi) to secure a high enough zoom ratio, (vii) to set forth a condition for the movement of the first lens unit in view of correcting the chromatic aberrations of the fourth lens unit and (viii) to shorten the total length for the telephoto end.

In a basic embodiment of the invention, the zoom lens comprises, from front to rear, a first lens unit of negative refractive power, a second lens unit of positive refractive power, a third lens unit of positive refractive power and a fourth lens unit of negative refractive power, totaling four lens units, wherein the lens units are made to axially move in differential relation to vary the focal length, and wherein when zooming from a wide-angle end to a telephoto end, an air separation between the first and second lens units increases, an air separation between the second and third lens units increases and an air separation between the third and fourth lens units decreases.

This and other characteristic features of the invention will become apparent from the following description.

BRIEF DESCRIPTION OF THE DRAWINGS

FIGS. 2(A), 2(B) and 2(C) are block diagrams of a numerical example 2 of the zoom lens of the invention.

FIGS. 3(A), 3(B) and 3(C) are block diagrams of a numerical example 3 of the zoom lens of the invention.

FIGS. 4(A), 4(B) and 4(C) are block diagrams of a numerical example 4 of the zoom lens of the invention.

FIGS. 13(A), 13(B) and 13(C) are block diagrams of a numerical example 8 of the zoom lens of the invention.

FIGS. 17(A), 17(B) and 17(C) are block diagrams of a numerical example 9 of the zoom lens of the invention.

In these figures, S: the sagittal image focus; M: the meridional image focus; d: the spectral d-line; and g: the spectral g-line.

DETAILED DESCRIPTION OF THE PREFERRED EMBODIMENTS

Figures 1A, 1B, 1C:
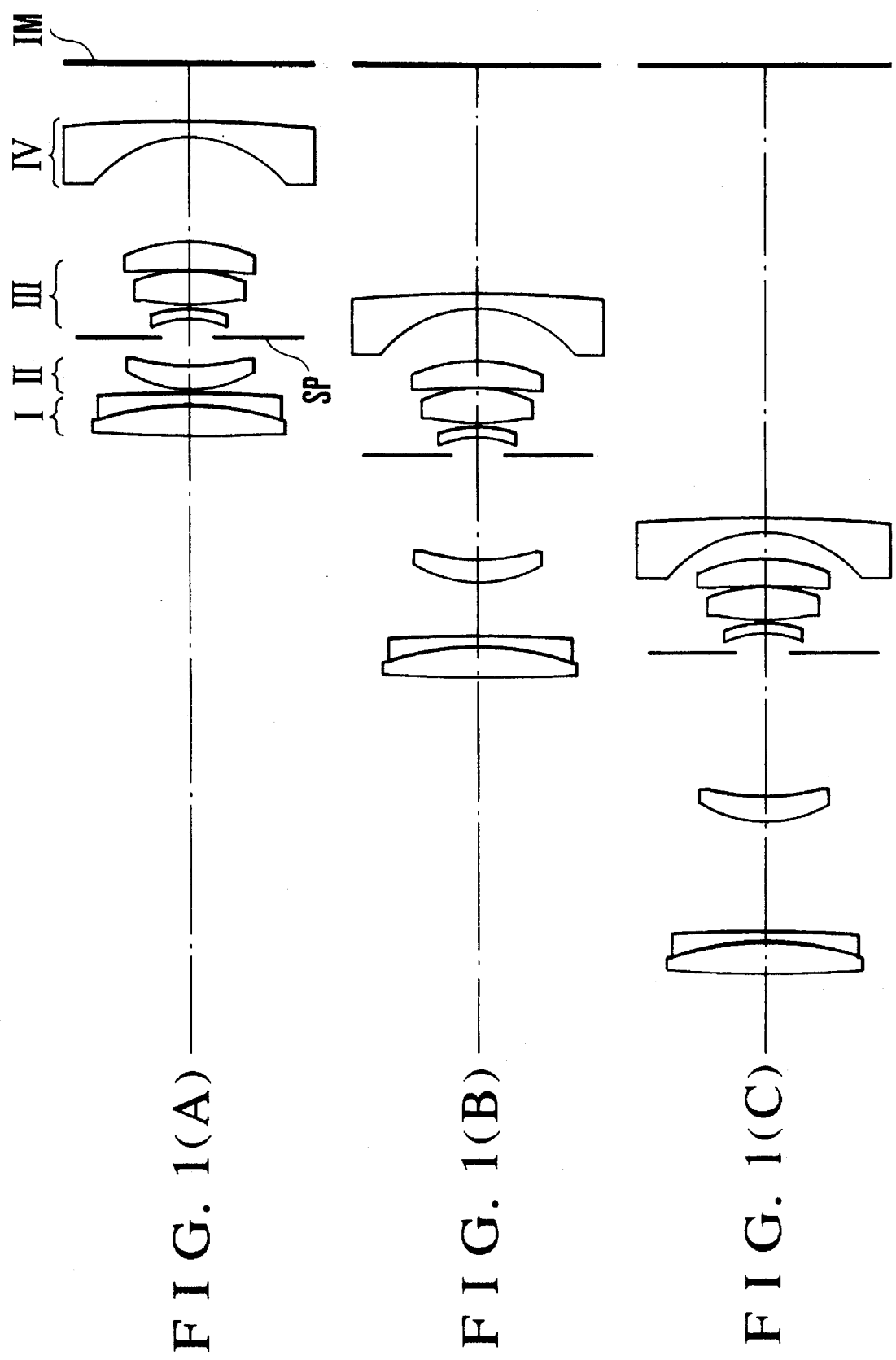
FIGS. 1(A), 1(B) and 1(C) are block diagrams of a numerical example 1 of the zoom lens of the invention.
Figures 5A, 5B, 5C:
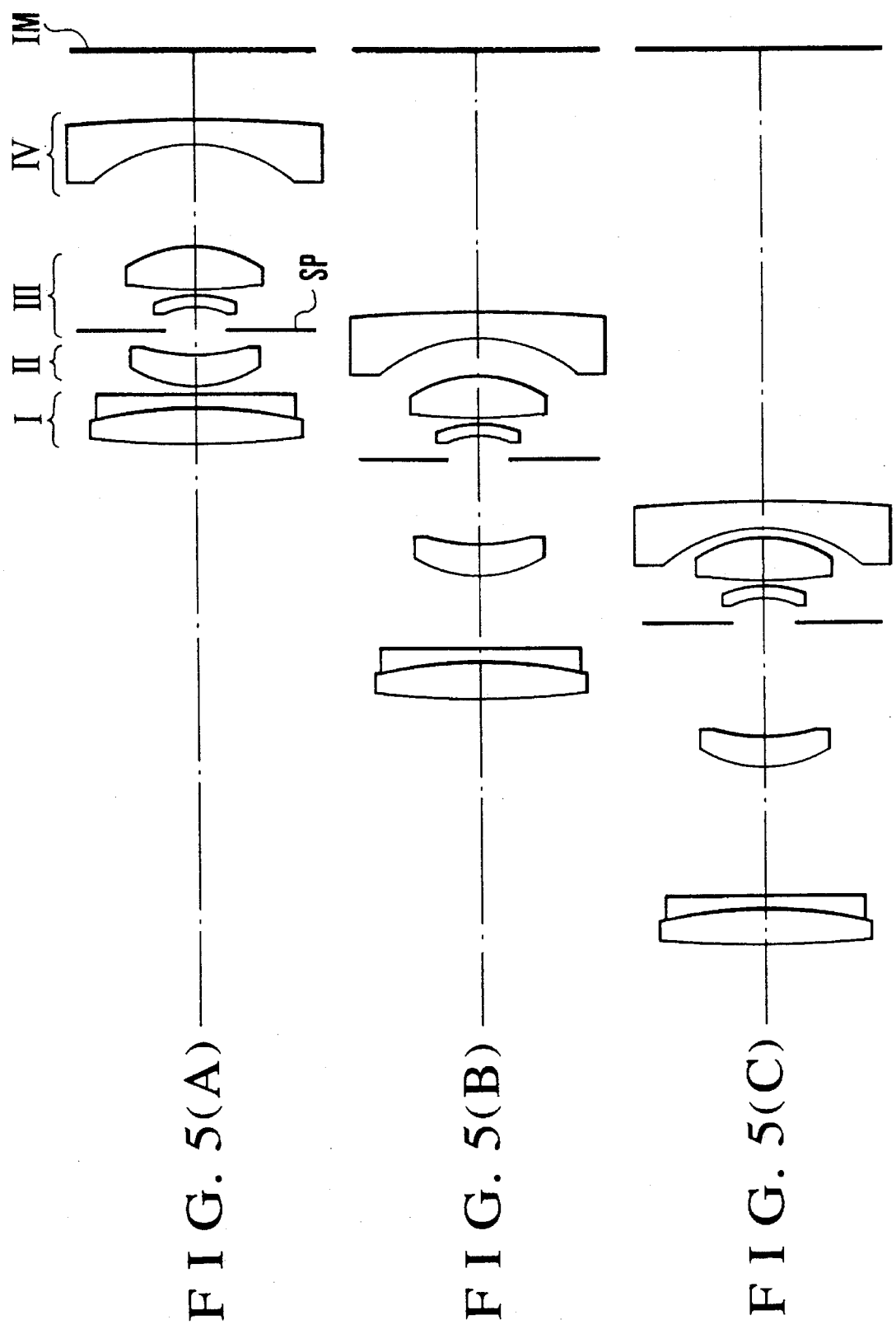
FIGS. 5(A), 5(B) and 5(C) are block diagrams of a numerical example 5 of the zoom lens of the invention.

FIGS. 1(A), 1(B) and 1(C) through FIGS. 5(A), 5(B) and 5(C) in lens block diagrams show numerical examples 1 through 5 of zoom lenses of the invention, respectively. Reference characters I, II, III and IV denote respectively a first lens unit of negative refractive power, a second lens unit of positive refractive power, a third lens unit of positive refractive power and a fourth lens unit of negative refractive power arranged in this order from the object side. SP denotes an Fno. stop (that determines the F-number) fixed to the second lens unit. IM denotes an image plane. In addition, zooming from the wide-angle end to the telephoto end is performed by increasing the air separation between the first and second lens units, increasing the air separation between the second and third lens units and decreasing the air separation between the third and fourth lens units. In the lens block diagrams, the figures of the numbers suffixed (A), (B) and (C) denote the wide-angle end, a middle position and the telephoto end, respectively.

In a specific embodiment, all the lens units are made to axially move toward the object side when zooming from the wide-angle to the telephoto end.

For the zoom lens described above, additional rules of design are set forth. To attain desired results, the following inequalities of condition should be satisfied:

$$-3\times10^{-2} < hh_{3t}/(f_t-f_w) < 2\times10^{-2} \ldots \quad (1)$$

where
$f_w$: the shortest focal length of the entire system;
$f_t$: the longest focal length of the entire system; and
$hh_{3t}$: the interval between the principal points of the third and fourth lens units in the telephoto end.

The zoom lens described above should satisfy the following inequalities of condition:

$$0.1 < (d_{it}-d_{iw})/f_w < 0.9 \ldots \quad (2)$$

where
$d_{iw}$: the air separation between the i-th and (i+1)st lens units in the wide-angle end; and
$d_{it}$: the air separation between the i-th and (i+1)st lens unit in the telephoto end.
Also $$3.0\times10^{-3} < d_{1w}/f_w < 0.2 \ldots \quad (3)$$

$$3 < d_1/d_{1w} < 50 \ldots \quad (4)$$

$$2 < d_2/d_{2w} < 10 \ldots \quad (5)$$

For the zoom lens described before to attain desired results, the following inequalities of conditions should be satisfied:

$$-90 < f_1/f_w < -3 \ldots \quad (6)$$

where $f_1$: the focal length of the first lens unit.

$$-0.8 < f_4/f_w < -0.3 \ldots \quad (7)$$

where $f_4$: the focal length of the fourth lens unit.

The zoom lens described above should satisfy the following inequalities of condition:

$$2.0 < \beta_{4t}/\beta_{4w} < 5.0 \ldots \quad (8)$$

where
$\beta_{4w}$: the magnification for the infinitely distant object of the fourth lens unit in the wide-angle end; and
$\beta_{4t}$: the magnification for the infinitely distant object of the fourth lens unit in the telephoto end.

To achieve further improvements, it is desired to satisfy all of the conditions (1) to (8) described above at once.

A further feature of the zoom lens described above is that, as desired, such construction and arrangement is employed that the off-axial ray that travels through every lens surface is incident on the lens surface of the most image side at a highest position when in the wide-angle region, while permitting every lens unit to move toward the object side when zooming from the wide-angle end to the telephoto end.

As described before, even in the past there existed the zoom lens comprising four components of minus-plus-plus-minus power arrangement which was obtained by taking its basic form from the 2-component zoom lens of the plus-minus type. If the conventional 4-component zoom lens is modified to increase the zoom ratio to, for example, 3.5 or higher, the variation of aberrations resulting from the movement of those components which bear mainly the variation of the focal length would become hardly ignorable. For this reason, the number of lens elements in each of those components would have to increase so that the aberrations are corrected well.

In other words, in a case where the technique of shortening the total length of the entire system is relied on the strengthening of the refractive power of the component, the increase of the aberrations can be suppressed by increasing the number of lens elements. However, such increase of the number of lens elements in turn causes an increase of the difficulty of, when focusing down, retracting the photographic lens deeper into the interior of the camera body than a certain distance.

The main one of the characteristic features of the invention is that, given the 4-unit configuration of minus-plus-plus-minus power arrangement, the separation between the first and second lens units is made to increase when zooming from the wide-angle end to the telephoto end. With this, since the fourth lens unit contributes to a main proportion of the variation of the focal length, because the chromatic aberrations the fourth lens unit produces can now become possible to be corrected by a suited design of the first lens unit, the duty of the fourth lens unit for correction of aberrations is diminished, thus avoiding the number of lens elements from increasing unduly greatly.

Next, the significance of each of the limits of the above-stated inequalities of conditions (1) to (8) is described below.

The inequalities (1) are concerned with the principal point interval between the third and fourth lens units in terms of the shortest and longest focal lengths of the entire system. When the upper limit of the inequalities (1) is exceeded, as this means that the principal point interval between the third and fourth lens units is too long, it becomes difficult to obtain a predetermined value of the zoom ratio. If one dares to make a change of the power arrangement so as to assure formation of the predetermined value of the zoom ratio, the total length for the telephoto end is caused to increase very long. When the lower limit of the inequalities (1) is exceeded, as this means that the principal point interval is too short, it becomes difficult to secure a real space in the separation between the third and fourth lens units. So, there is an appreciable possibility of occurrence for both lens units of interfering with each other as is attributable to the manufacturing tolerance and others.

The inequalities (2) are concerned with the air separations for the wide-angle and telephoto ends between the first and second lens units in terms of the shortest focal length. When the upper limit of the inequalities (2) is exceeded, as this means that the air separation for the telephoto end between the first and second lens units is too long, the total length of the entire system in the telephoto end becomes objectionably too long. When the lower limit of the inequalities (2) is exceeded, as this means that the difference between the air separations for the telephoto and wide-angle ends between the first and second lens units is too small, it becomes difficult to design the first lens unit so as to cancel the variation of the aberrations the fourth lens unit produces. As a whole, therefore, good correction of aberrations can be hardly done.

The inequalities (3) are concerned with the air separation for the wide-angle end between the first and second lens units in terms of the shortest focal length. When the upper limit is exceeded, as this means that the separation between the first and second lens units is too long, it is in the wide-angle end that the total length of the entire system and the diameter of the front lens members come to increase. When the lower limit of the inequalities (3) is exceeded, as this means that the separation between the first and second lens units is too short, there is an appreciable possibility of occurrence for both lens units of interfering with each other, if the manufacturing tolerance is not precise.

The inequalities (4) are concerned with the ratio of the separations for the telephoto and wide-angle ends between the first and second lens units. When the upper limit of the inequalities (4) is exceeded, as this implies that the separation for the telephoto end between the first and second lens units is too long, the total length becomes inconveniently long when in the telephoto end. When the lower limit of the inequalities (4) is exceeded, as this means that the separation for the telephoto end between the first and second lens units is too short, it becomes difficult to correct chromatic aberrations against zooming.

The inequalities (5) are concerned with the ratio of the separations for the telephoto and wide-angle ends between the second and third lens units. When the upper limit of the inequalities (5) is exceeded, as this means that the separation for the telephoto end between the second and third lens units is too long, the total length when in the telephoto end becomes longer than desired. When the lower limit of the inequalities (5) is exceeded, as this means that the separation for the telephoto end between the second and third lens units is too short, it becomes difficult to correct the variation of various aberrations with zooming.

The inequalities (6) are concerned with the ratio of the focal length of the first lens unit to the shortest focal length of the entire system. When the upper limit of the inequalities (6) is exceeded, as this means that the focal length of the first lens unit is too short, the retro ratio in the telephoto end becomes large and the total length in the telephoto end becomes longer than desired. When the lower limit of the inequalities (6) is exceeded, as this means that the focal length of the first lens unit is too long, the image angle response characteristic of the wide-angle side becomes worse. So, it becomes difficult to correct the off-axial aberrations when on the wide-angle side.

The inequalities (7) are concerned with the ratio of the focal length of the fourth lens unit to the longest focal length. When the upper limit of the inequalities (7) is exceeded, as this means that the focal length of the fourth lens unit is too short, it becomes difficult to correct coma flare at or near the wide-angle end. When the focal length of the fourth lens unit is too long as exceeding the lower limit of the inequalities (7), the stroke of movement for zooming of the fourth lens unit increases objectionably. So, the total length when in the telephoto end becomes longer than desired.

The inequalities (8) are concerned with the ratio of the magnifications for the telephoto and wide-angle ends of the fourth lens unit. When the upper limit of the inequalities (8) is exceeded, as this means that the magnification ratio of the fourth lens unit is too large, it becomes difficult to correct the variation of various aberrations with zooming. When the magnification ratio of the fourth lens unit is too small as exceeding the lower limit of the inequalities (8), a necessity of securing the zoom ratio in another section arises. So, the lens system as a whole tends to get greater in size objectionably.

To enhance the performance, either or both of the above-described upper and lower limits of the inequalities of conditions (1) to (8) may be contracted as follows:

$$-5\times10^{-3} < hh_3/(f_t-f_w) < 8\times10^{-3} \ldots \quad (1')$$

$$0.3 < (d_{1t}-d_{1w})/f_w < 0.6 \ldots \quad (2')$$

$$1\times10^{-2} < d_{1w}/f_w < 6\times10^{-2} \ldots \quad (3')$$

$$10 < d_1/f_w < 35 \ldots \quad (4')$$

$$3.5 < d_2/d_{2w} < 7 \ldots \quad (5')$$

$$-25 < f_1/f_w < -4 \ldots \quad (6')$$

$$-0.7 < f_4/f_w < -0.45 \ldots \quad (7')$$

$$2.5 < \beta_{4t}/\beta_{4w} < 3.5 \ldots \quad (8')$$

FIGS. 1(A), 1(B) and 1(C) to FIGS. 5(A), 5(B) and 5(C) in lens block diagrams show the numerical examples 1 to 5 of zoom lenses, respectively. The figure numbers suffixed (A) show the wide-angle end, the figure numbers suffixed (B) show a middle focal length position, and the figure numbers suffixed (C) show the telephoto end. When zooming from the wide-angle end to the telephoto end, all the lens units move axially toward the object side in such relation that the air separation between the first lens unit I and the second lens unit II increases, the air separation between the second lens unit II and the third lens unit III increases and the air separation between the third lens unit III and the fourth lens unit IV decreases. Particularly in the zoom lens of the numerical example 5 (FIGS 5(A), 5(B) and 5(C)), when zooming, the second and fourth lens units are made to move in unison, thus simplifying the structure of construction of the operation mechanism. Focusing is performed by moving either the third lens unit III or bodily moving the entire system. In particular, to improve the compact form of the lens system, it is desired to select the third lens unit for focusing purposes, that is, to employ the inner focus method.

In the zoom lenses of the numerical examples 1 to 3 and 5, the first lens unit is constructed in a 2-member form with a bi-convex lens whose rear surface is tighter in curvature than the opposite one and a negative lens whose front concave surface is stronger in refracting power than the opposite one.

In the zoom lens of the numerical example 4, the first lens unit is constructed with only one member or a negative lens having an aspheric surface on the image side thereof.

In the zoom lenses of the numerical examples 1 to 5, the second lens unit is constructed with only one member or a positive meniscus lens convex toward the object side.

In the zoom lenses of the numerical examples 1 and 2, the third lens unit is constructed with a stop at the frontmost position and with a negative meniscus lens concave toward the object side and two positive lenses whose rear surfaces are tighter in curvature than the opposite ones, totaling three lens members.

In the zoom lenses of the numerical examples 3 to 5, the third lens unit is constructed with a stop at the frontmost position and with a negative meniscus lens concave toward the object side and a bi-convex lens whose rear surface is tighter in curvature than the opposite one, totaling two lens members.

In the zoom lenses of the numerical examples 1 to 5, the third lens unit has its rearmost surface made aspherical.

In the zoom lenses of the numerical examples 1 to 5, the fourth lens unit is constructed with only one member or a negative lens whose front surface is tighter concave in curvature than the opposite one and which has an aspheric surface.

The numerical data for the examples 1 to 5 are listed in the tables below, where Ri is the radii of curvature, Di is the lens surface separations, Ni is the refractive indices, and $\upsilon i$ is the Abbe numbers.

The aspheric surface is expressed by $$x = (y^2/r)/\{1 + \sqrt{1-(1+k)(y/r)^2}\ \} +$$

$$Ay^2 + By^4 + Cy^6 + Dy^8 + Ey^{10} + \ldots$$

where A to E are the coefficients.

Also the notations: "e+i" and "e-i" represent $\times 10^i$ and $\times 10^{-i}$, respectively.

Figure 6A:
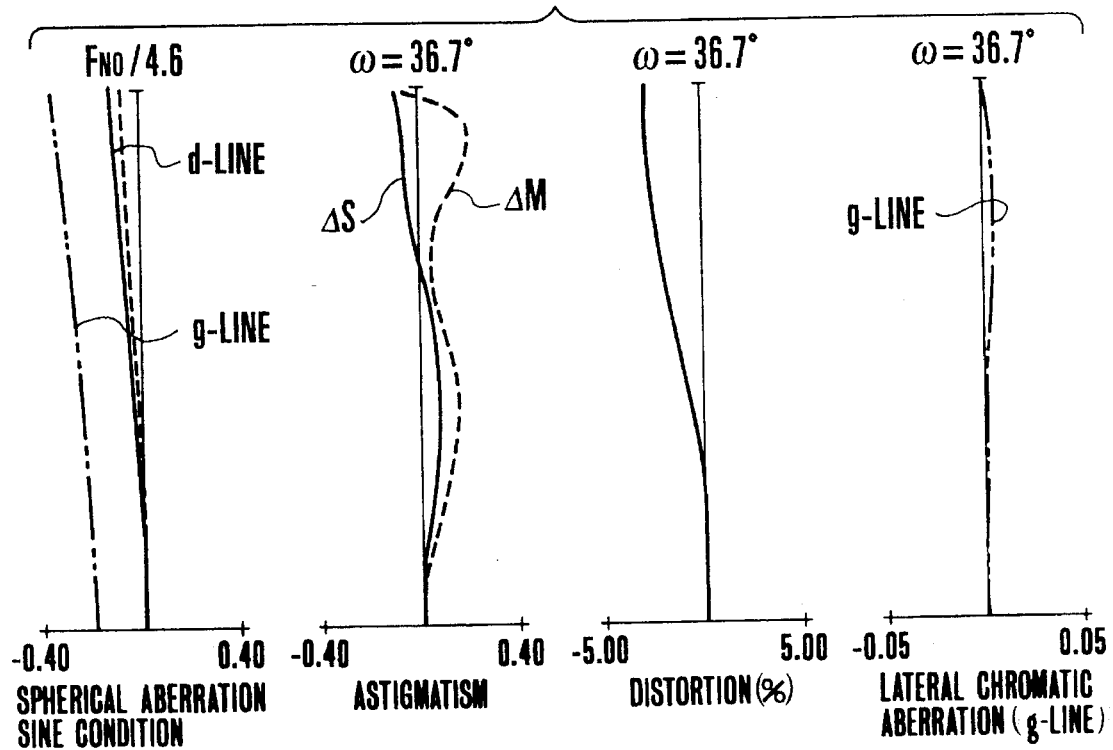
FIGS. 6(A), 6(B) and 6(C) are graphic representations of the various aberrations of the numerical example 1 of the invention.
Figure 6B:
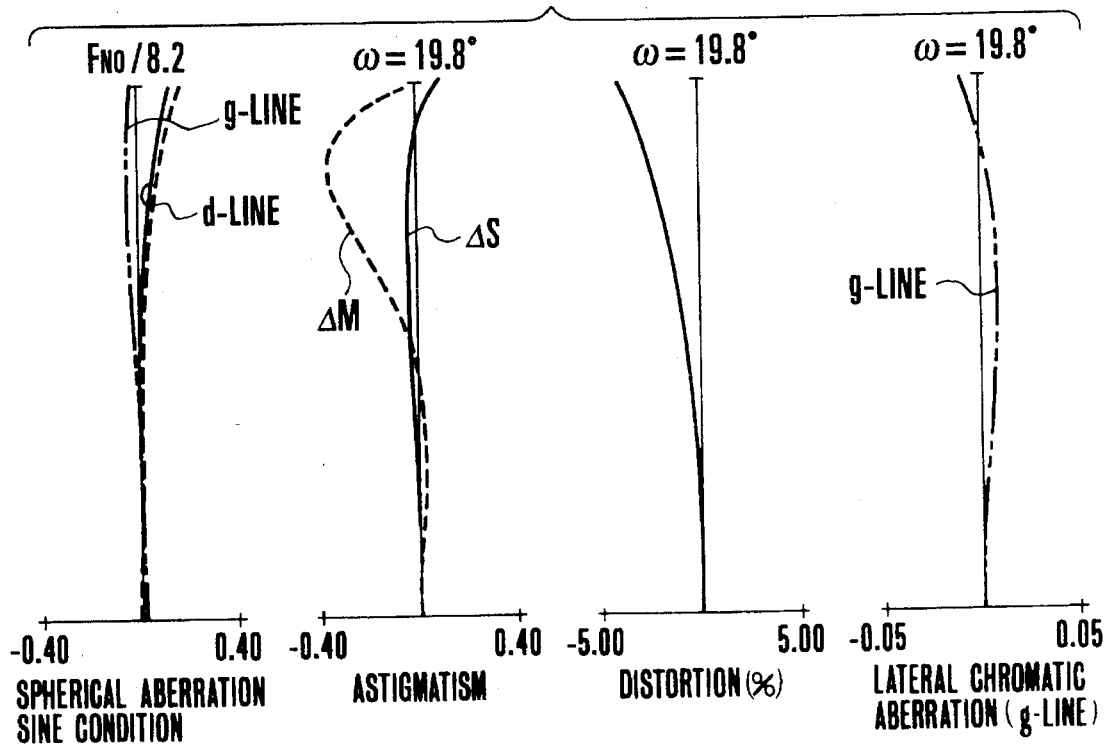
Figure 6C:
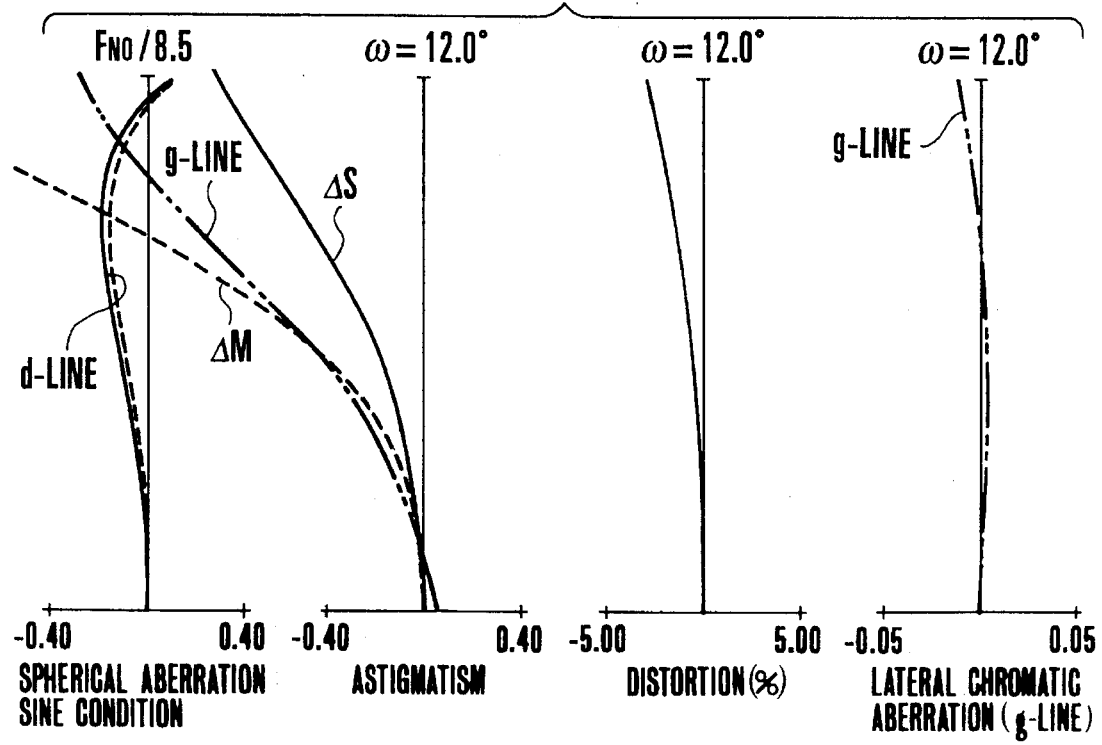
Figure 7A:
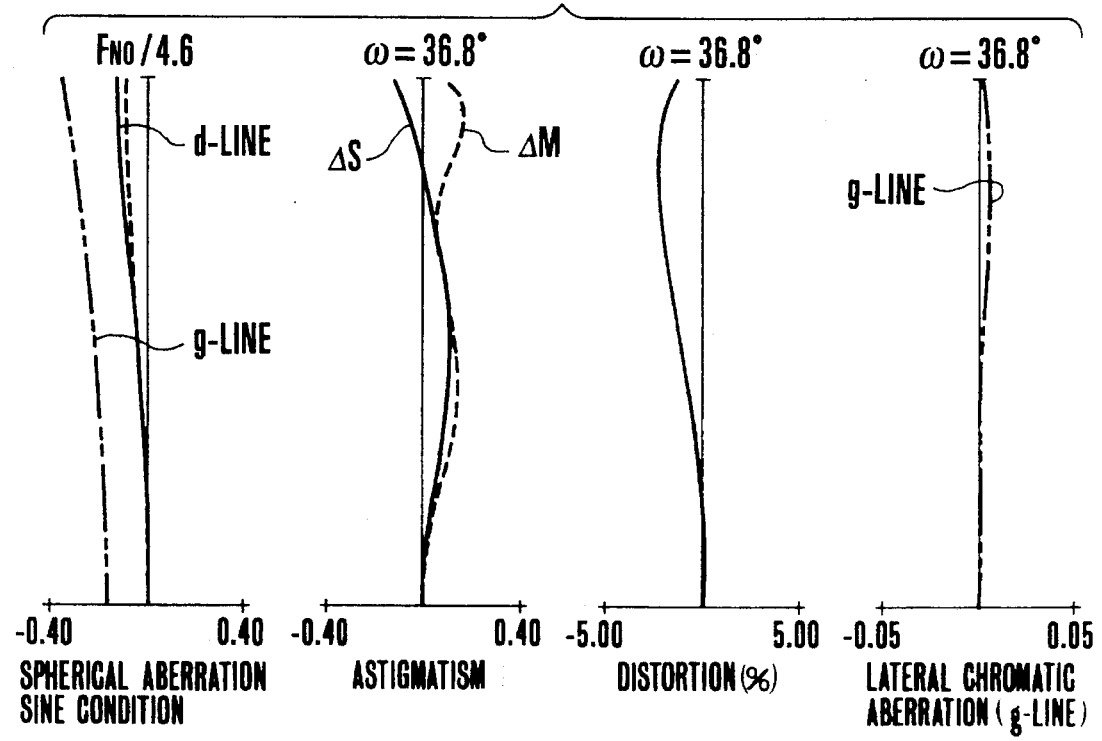
FIGS. 7(A), 7(B) and 7(C) are graphic representations of the various aberrations of the numerical example 2 of the invention.
Figure 7B:
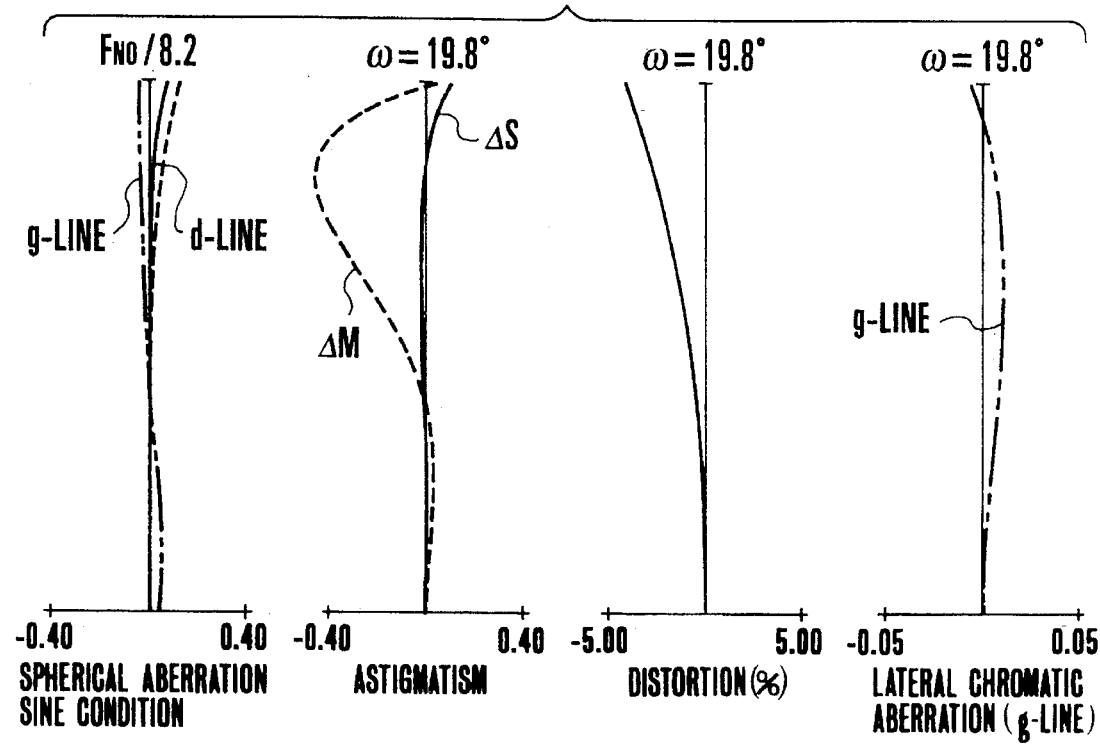
Figure 7C:
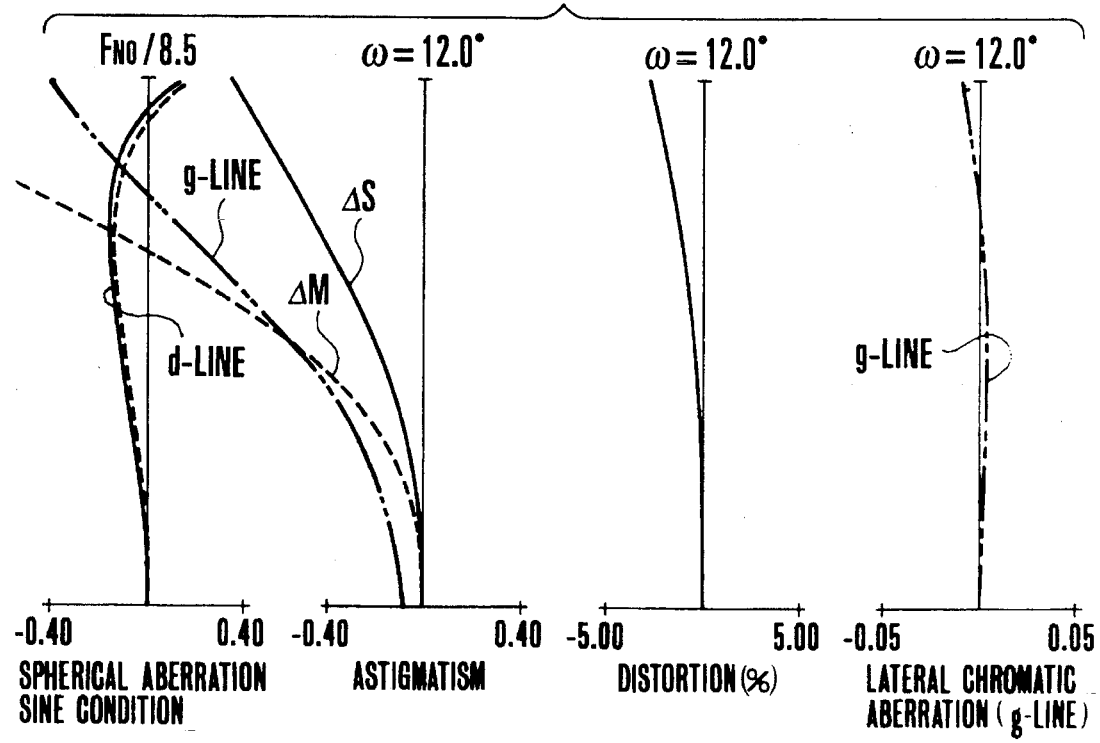
Figure 8A:
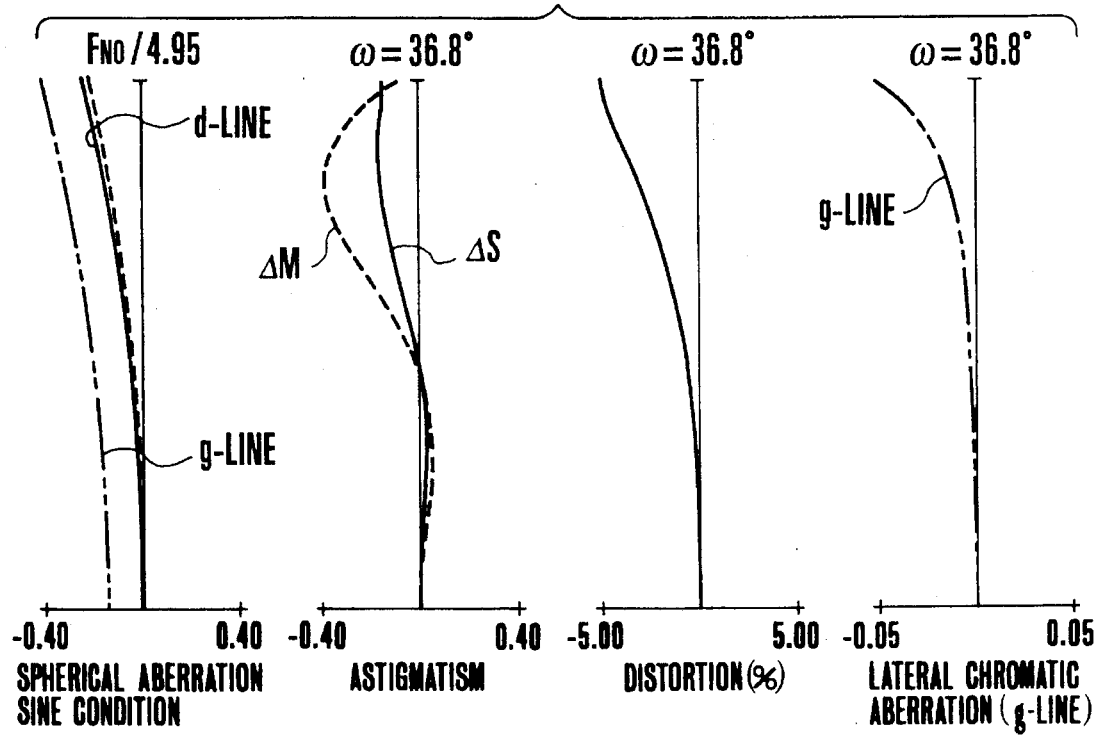
FIGS. 8(A), 8(B) and 8(C) are graphic representations of the various aberrations of the numerical example 3 of the invention.
Figure 8B:
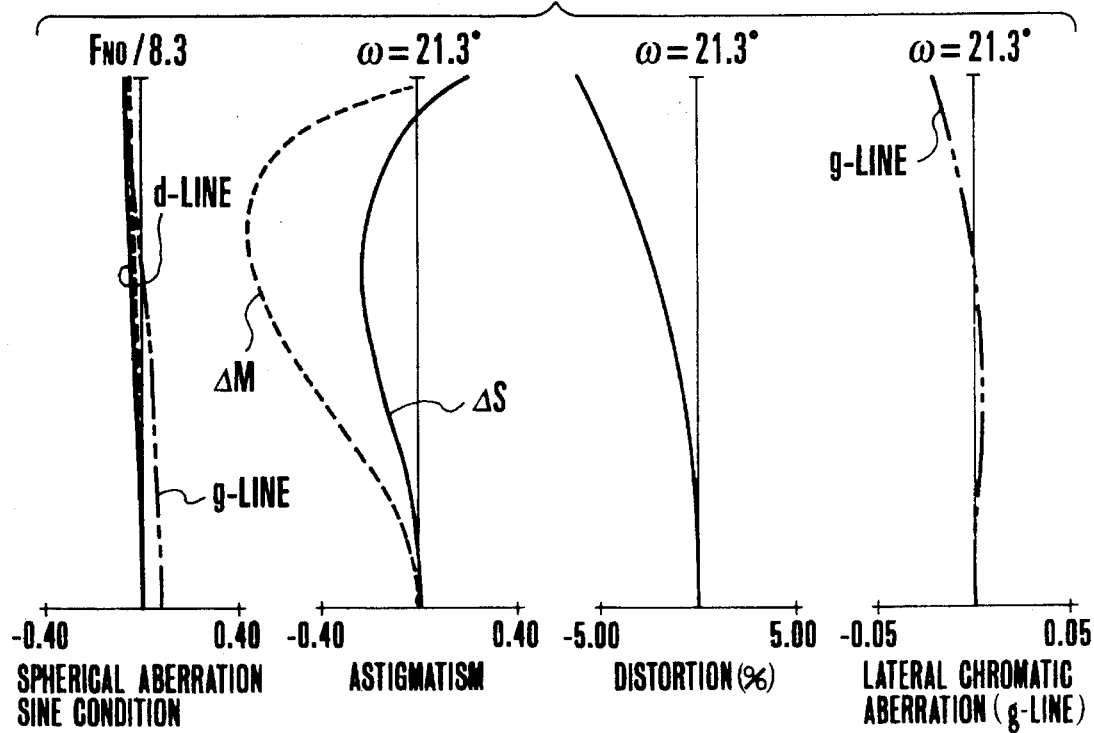
Figure 8C:
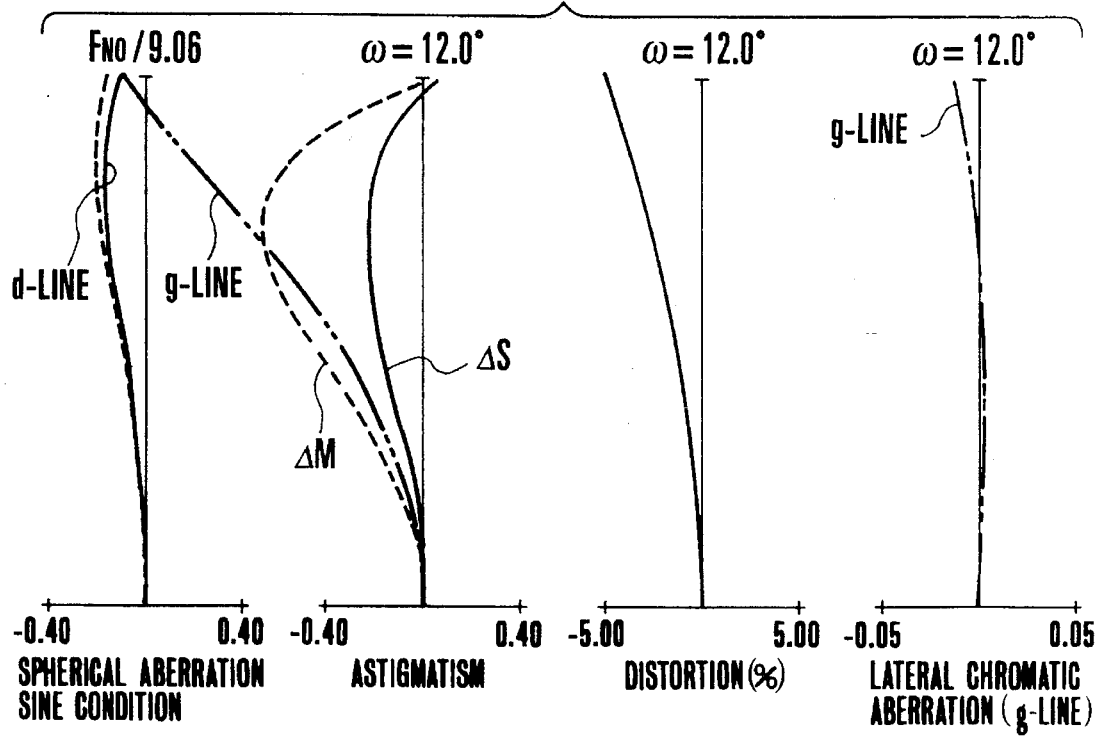
Figure 9A:
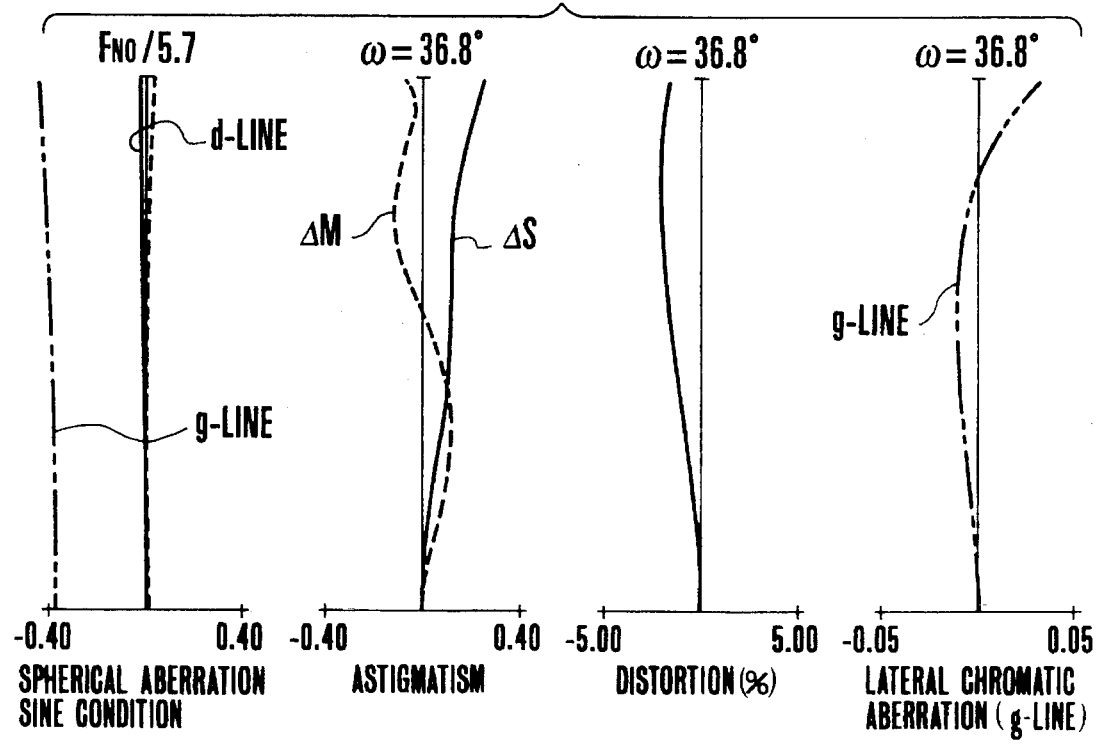
FIGS. 9(A), 9(B) and 9(C) are graphic representations of the various aberrations of the numerical example 4 of the invention.
Figure 9B:
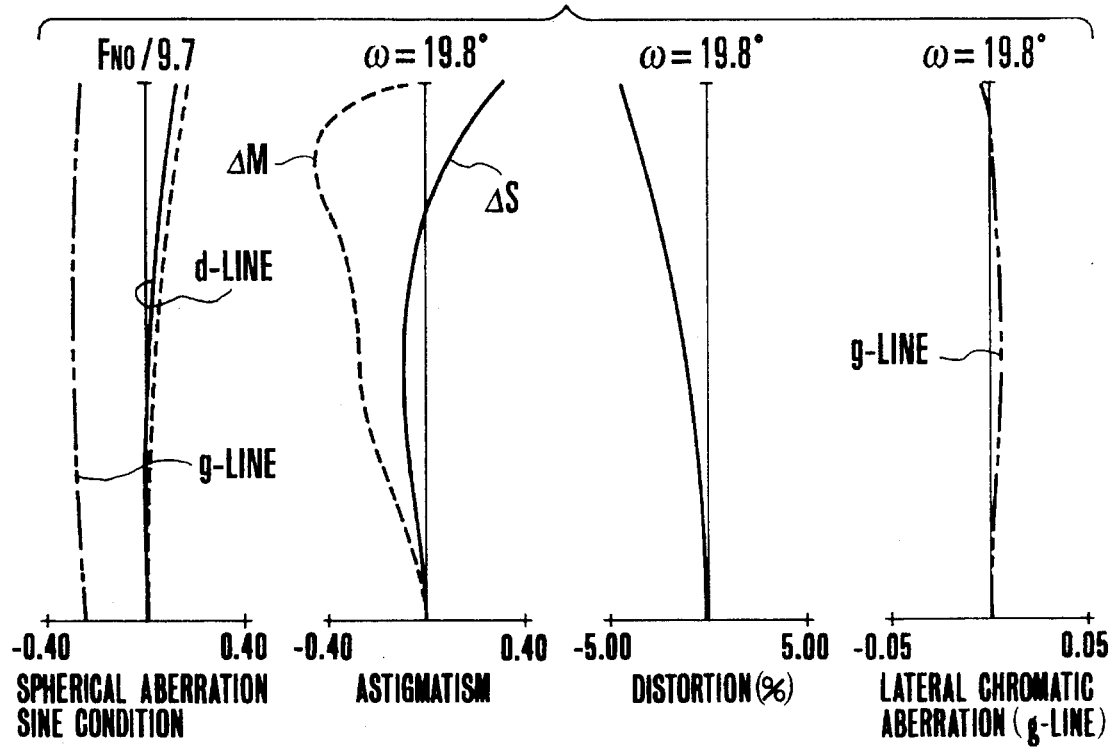
Figure 9C:
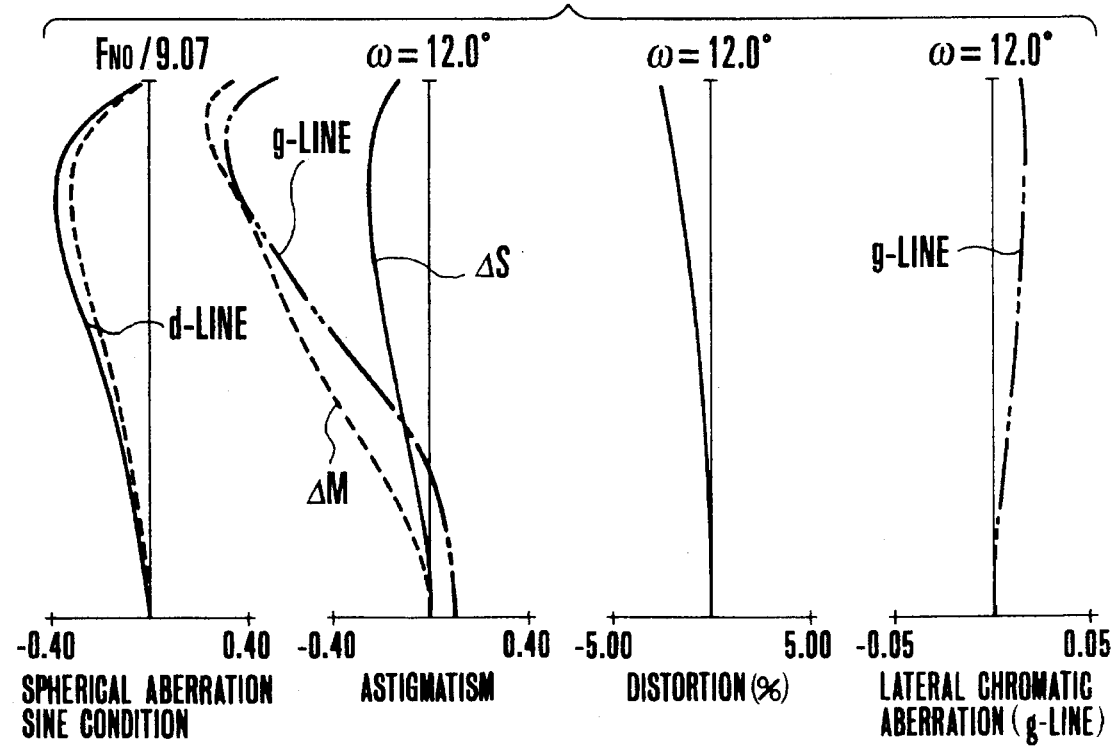
Figure 10A:
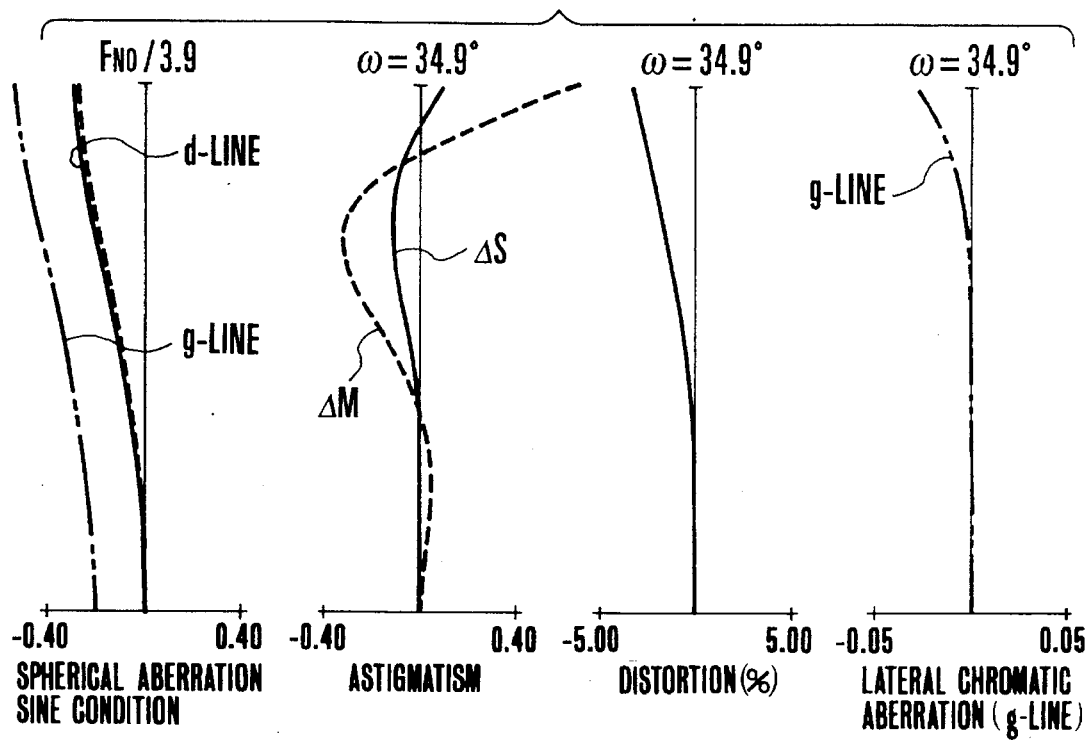
FIGS. 10(A), 10(B) and 10(C) are graphic representations of the various aberrations of the numerical example 5 of the invention.
Figure 10B:
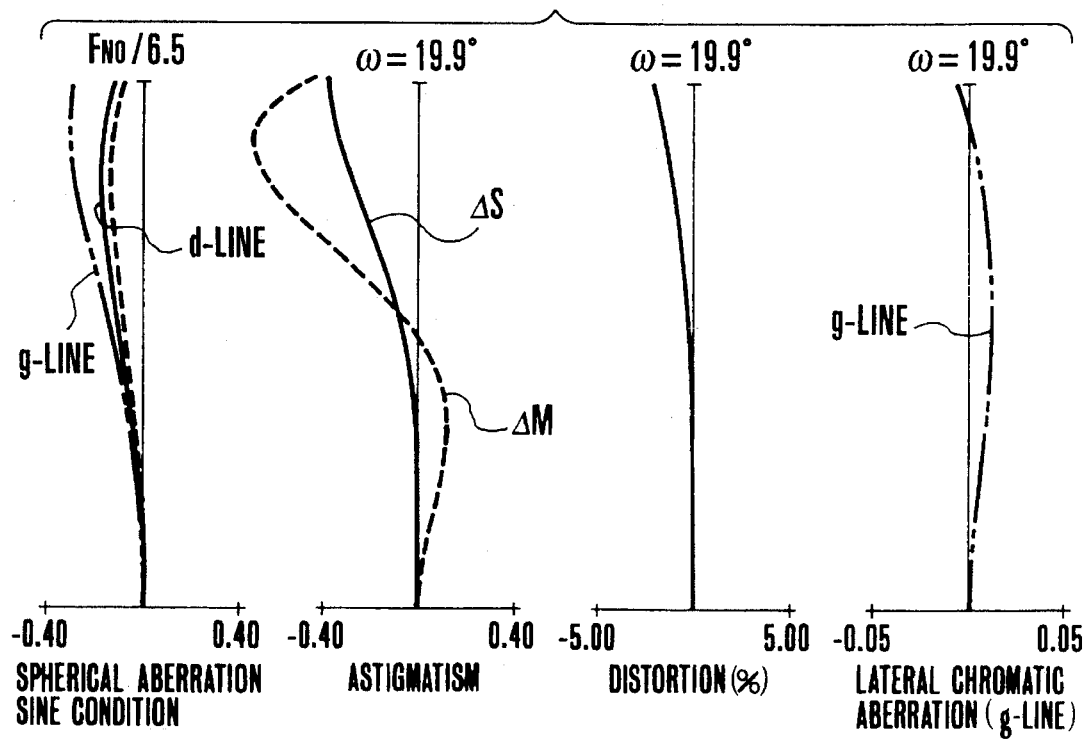
Figure 10C:
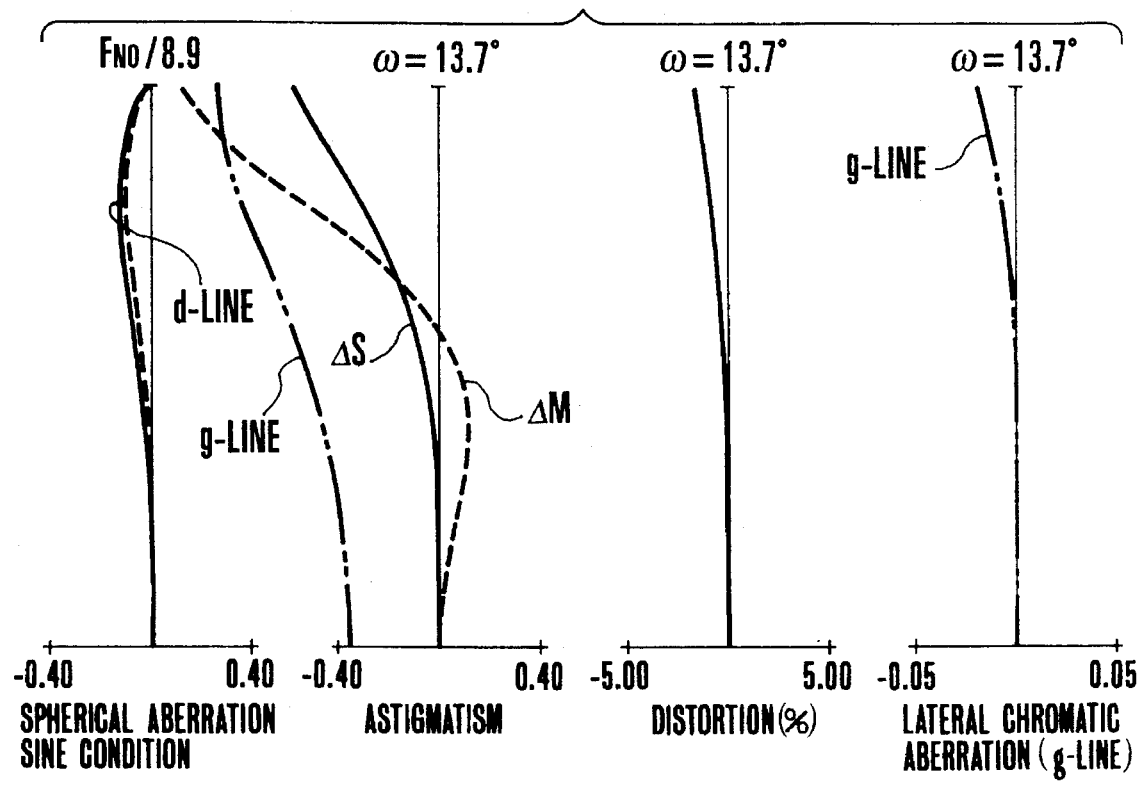

The aberration curves of FIGS. 6(A), 6(B) and 6(C) to FIGS. 10(A), 10(B) and 10(C) are of the numerical examples 1 to 5, respectively. The figure numbers suffixed (A) show the wide-angle end, the figure numbers suffixed (B) show a middle focal length position and the figure numbers suffixed (C) show the telephoto end.

NUMERICAL EXAMPLE 1

| | | | |
|---|---|---|---|
| f = 29.04–101.71 | Fno = 4.60–8.5 | 2ω = 73.4–24.0 | |
| R1 = 118.562 | D1 = 3.42 | N1 = 1.487490 | ν1 = 70.2 |
| R2 = −35.582 | D2 = 0.10 | | |
| R3 = −35.382 | D3 = 1.20 | N2 = 1.346659 | ν2 = 23.8 |
| R4 = −241.351 | D4 = Variable | | |
| R5 = 14.641 | D5 = 2.57 | N3 = 1.728249 | ν3 = 23.5 |
| R6 = 22.889 | D6 = Variable | | |
| R7 = (Stop) | D7 = 2.00 | | |
| R8 = −10.256 | D8 = 1.02 | N4 = 1.834000 | ν4 = 37.2 |

-continued

| | | | |
|---|---|---|---|
| R9 = −17.855 | D9 = 0.45 | | |
| R10 = 35.556 | D10 = 3.64 | N5 = 1.516330 | v5 = 64.2 |
| R11 = −16.823 | D11 = 0.10 | | |
| R12 = −51.320 | D12 = 2.88 | N6 = 1.583126 | v6 = 59.4 |
| *R13 = −15.320 | D13 = Variable | | |
| *R14 = −10.856 | D14 = 2.00 | N7 = 1.743198 | v7 = 49.3 |
| R15 = −183.856 | | | |

| Variable | Focal Length | | |
|---|---|---|---|
| Separation | 29.04 | 60.11 | 101.71 |
| D4 | 0.50 | 6.31 | 12.27 |
| D6 | 3.21 | 11.54 | 15.71 |
| D13 | 11.39 | 5.41 | 2.50 |

Total Length:

40.52 at Wide-Angle End
99.08 at Telephoto End
Aspheric Coefficients:
R13:

| | | |
|---|---|---|
| k = −3.14288e + 00 | A = 0 | B = 1.17682e − 05 |
| C = 3.32391e − 07 | D = 6.56194e − 09 | E = −6.63570e − 11 |

R14:

| | | |
|---|---|---|
| k = −4.49468e − 01 | A = 0 | B = 1.16632e − 04 |
| C = 3.72619e − 07 | D = −4.76830e − 09 | E = 1.97521e − 11 |

NUMERICAL EXAMPLE 2

| | | | |
|---|---|---|---|
| f = 26.98–101.40 | Fno = 4.60–8.5 | 2ω = 73.5–24.1 | |
| R1 = 135.322 | D1 = 3.31 | N1 = 1.487490 | v1 = 70.2 |
| R2 = −35.736 | D2 = 0.10 | | |
| R3 = −35.369 | D3 = 1.20 | N2 = 1.846659 | v2 = 23.8 |
| R4 = −187.016 | D4 = Variable | | |
| R5 = 14.140 | D5 = 2.56 | N3 = 1.728249 | v3 = 28.5 |
| R6 = 21.479 | D6 = Variable | | |
| R7 = (Stop) | D7 = 2.00 | | |
| R8 = −11.105 | D3 = 1.00 | N4 = 1.834000 | v4 = 37.2 |
| R9 = −24.658 | D9 = 0.33 | | |
| R10 = 32.741 | D10 = 3.53 | N5 = 1.487490 | v5 = 70.2 |
| R11 = −19.784 | D11 = 0.10 | | |
| R12 = 4117.875 | D12 = 3.50 | N6 = 1.583126 | v6 = 59.4 |
| *R13 = −15.006 | D13 = Variable | | |
| *R14 = −10.313 | D14 = 1.50 | N7 = 1.665320 | v7 = 55.4 |
| R15 = −4730.409 | | | |

| Variable | Focal Length | | |
|---|---|---|---|
| Separation | 28.98 | 59.93 | 101.40 |
| D4 | 0.50 | 6.31 | 12.65 |
| D6 | 3.21 | 11.00 | 14.85 |
| D13 | 11.27 | 5.35 | 2.50 |

Total Length:

40.49 at Wide-Angle End
98.93 at Telephoto End
Aspheric Coefficients:
R13:

| | | |
|---|---|---|
| k = −3.04508e + 00 | A = 0 | B = 1.01667e − 05 |
| C = 4.23318e − 07 | D = 2.75211e − 09 | E = 5.55459e − 11 |

R14:

| | | |
|---|---|---|
| k = −3.41051e − 01 | A = 0 | B = 1.46581e − 04 |
| C = 5.44786e − 07 | D = −6.67978e − 09 | E = 3.60238e − 11 |

NUMERICAL EXAMPLE 3

| f= 28.95–101.55 | Fno = 4.95–9.06 | 2ω = 73.5–24.1 | |
|---|---|---|---|
| R1 = 62.616 | D1 = 3.80 | N1 = 1.487490 | ν1 = 70.2 |
| R2 = −41.448 | D2 = 0.11 | | |
| R3 = −39.448 | D3 = 1.20 | N2 = 1.846659 | ν2 = 23.8 |
| R4 = 986.523 | D4 = Variable | | |
| R5 = 15.665 | D5 = 2.50 | N3 = 1.784723 | ν3 = 25.7 |
| R6 = 24.510 | D6 = Variable | | |
| R7 = (Stop) | D7 = 2.10 | | |
| R8 = −10.437 | D8 = 1.00 | N4 = 1.846659 | ν4 = 23.8 |
| R9 = −14.514 | D9 = 0.85 | | |
| R10 = 44.541 | D10 = 5.00 | N5 = 1.583126 | ν5 = 59.4 |
| *R11 = −12.942 | D11 = Variable | | |
| *R12 = −9.722 | D12 = 1.50 | N6 = 1.743198 | ν6 = 49.3 |
| *R13 = −47.447 | | | |

| Variable Separation | Focal Length | | |
|---|---|---|---|
| | 28.95 | 55.40 | 101.55 |
| D4 | 1.17 | 6.64 | 13.21 |
| D6 | 3.16 | 9.99 | 17.10 |
| D11 | 12.52 | 6.40 | 2.37 |

Total Length:

40.34 at Wide-Angle End
99.13 at Telephoto End
Aspheric Coefficients:
R11:

| k = −1.68018e + 00 | A = 0 | B = 1.92606e − 06 |
|---|---|---|
| C = −1.71236e − 07 | D = 8.58958e − 09 | E = 0.00000e + 00 |

R12:

| k = −8.82017e − 01 | A = 0 | B = 8.80573e − 05 |
|---|---|---|
| C = −3.69884e − 07 | D = −1.35664e − 09 | E = 2.50436e − 11 |

R13:

| k = 0.00000e + 00 | A = 0 | B = 2.49540e − 05 |
|---|---|---|
| C = −2.20102e − 07 | D = 7.40066e − 10 | E = 0.00000e + 00 |

NUMERICAL EXAMPLE 4

| f = 29.00–101.45 | Fno = 5.70–9.70 | 2ω = 73.5–24.1 | |
|---|---|---|---|
| R1 = 62.019 | D1 = 1.20 | N1 = 1.846659 | ν1 = 23.8 |
| R2 = 39.364 | D2 = Variable | | |
| R3 = 13.224 | D3 = 3.04 | N2 = 1.487490 | ν2 = 70.2 |
| R4 = 36.240 | D4 = Variable | | |
| R5 = (Stop) | D5 = 2.00 | | |
| R6 = −7.664 | D6 = 1.65 | N3 = 1.882997 | ν3 = 40.8 |
| R7 = −9.145 | D7 = 1.38 | | |
| R8 = 33.352 | D8 = 5.00 | N4 = 1.487490 | ν4 = 70.2 |
| *R9 = −14.929 | D9 = Variable | | |
| *R10 = −11.500 | D10 = 1.50 | N5 = 1.743198 | ν5 = 49.3 |
| R11 = −115.205 | | | |

| Variable Separation | Focal Length | | |
|---|---|---|---|
| | 29.00 | 59.98 | 101.45 |
| D2 | 0.50 | 9.16 | 13.59 |
| D4 | 3.35 | 11.63 | 15.31 |
| D9 | 12.62 | 5.52 | 2.00 |

Total Length:

38.12 at Wide-Angle End
104.96 at Telephoto End
R2:

| k = 0.00000e + 00 | A = 0 | B = 4.85137e − 06 |
|---|---|---|
| C = 3.98469e − 08 | D = −3.46230e − 10 | E = 1.62102e − 12 |

R9:

| k = −2.95140e + 00 | A = 0 | B = −9.54658e − 06 |
|---|---|---|
| C = −5.92173e − 07 | D = 2.16526e − 08 | E = −2.34397e − 10 |

-continued

R10:

k = −8.63229e − 01    A = 0              B = 5.82480e − 05
C = −2.31662e − 07    D = 2.84595e − 10  E = −4.12094e − 12

NUMERICAL EXAMPLE 5

| f = 31.10–89.16 | Fno = 3.91–8.87 | 2ω = 69.7–27.3 | |
|---|---|---|---|
| R1 = 113.172 | D1 = 3.87 | N1 = 1.516330 | ν1 = 64.2 |
| R2 = −56.626 | D2 = 0.15 | | |
| R3 = −51.758 | D3 = 1.50 | N2 = 1.805181 | ν2 = 25.4 |
| R4 = −1251.512 | D4 = Variable | | |
| R5 = 13.351 | D5 = 3.47 | N3 = 1.621021 | ν3 = 35.3 |
| R6 = 20.288 | D6 = Variable | | |
| R7 = (Stop) | D7 = 2.65 | | |
| R8 = −8.978 | D8 = 1.25 | N4 = 1.805181 | ν4 = 25.4 |
| R9 = −12.600 | D9 = 0.70 | | |
| R10 = 56.478 | D10 = 4.71 | N5 = 1.583126 | ν5 = 59.4 |
| *R11 = −12.206 | D11 = Variable | | |
| *R12 = −12.630 | D12 = 2.51 | N6 = 1.677900 | ν6 = 55.3 |
| R13 = −180.398 | | | |

| Variable Separation | Focal Length | | |
|---|---|---|---|
| | 31.10 | 59.87 | 89.16 |
| D4 | 0.85 | 7.95 | 14.17 |
| D6 | 2.97 | 9.93 | 12.88 |
| D11 | 11.18 | 4.23 | 1.28 |

Aspheric Coefficients:
R11:

k = 0.00000e + 00     A = 0              B = 1.02660e − 04
C = −2.28136e − 07    D = 2.60121e − 08  E = −2.72152e − 10

R12:

k = −4.93741e01       A = 0              B = 5.50370e − 05
C = 4.38060e − 07     D = −4.16066e − 09 E = 1.24369e − 11

The values of the factors in the before-described conditions (1) to (8) for the numerical examples 1 to 4 are listed in Table-1 below:

Another embodiment of the invention which is improved over the first embodiment described above with attention to the relationship of the stop SP and the focusing lens is

TABLE 1

Figures 11A, 11B, 11C:
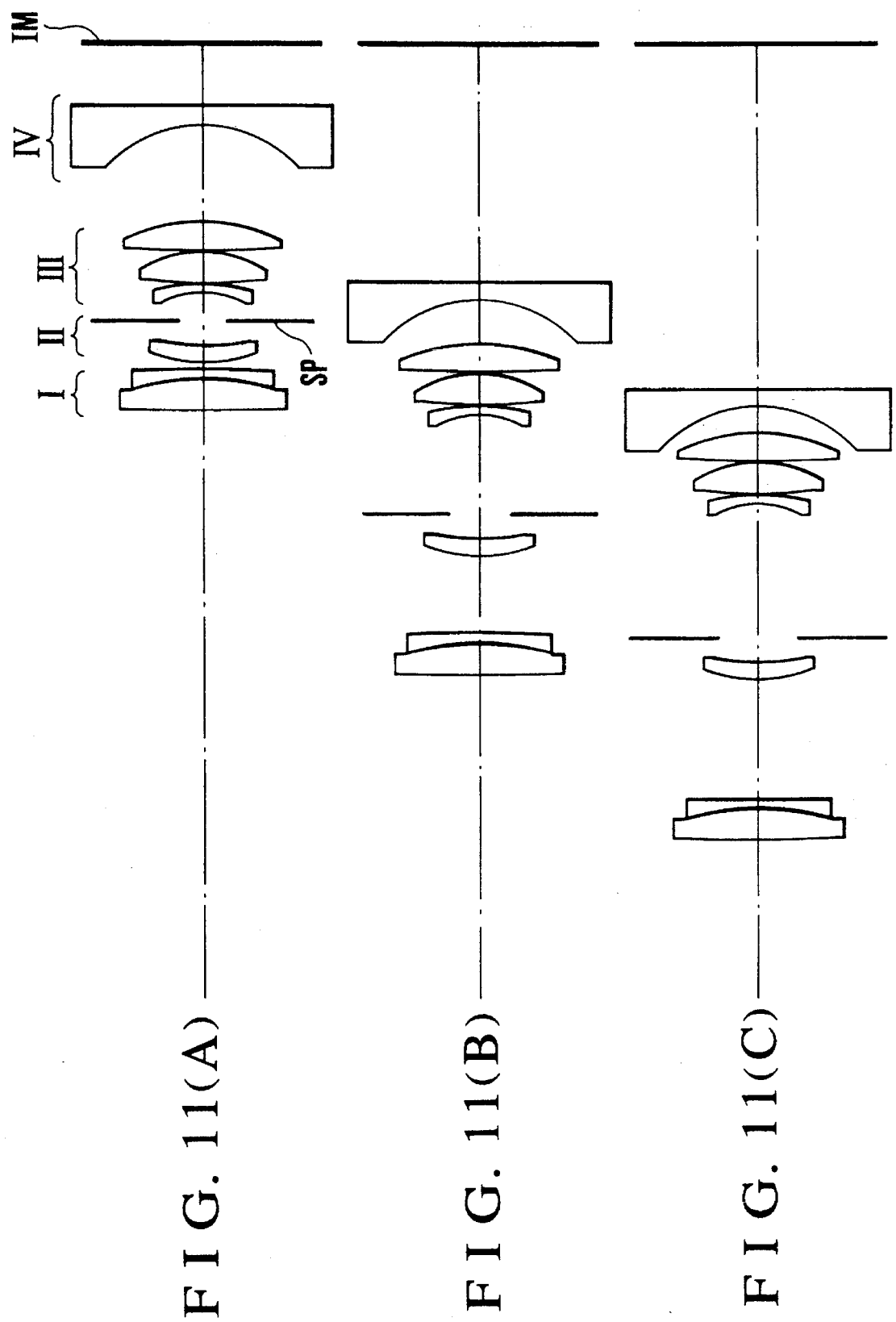
FIGS. 11(A), 11(B) and 11(C) are block diagrams of a numerical example 6 of the zoom lens of the invention.
Figures 12A, 12B, 12C:
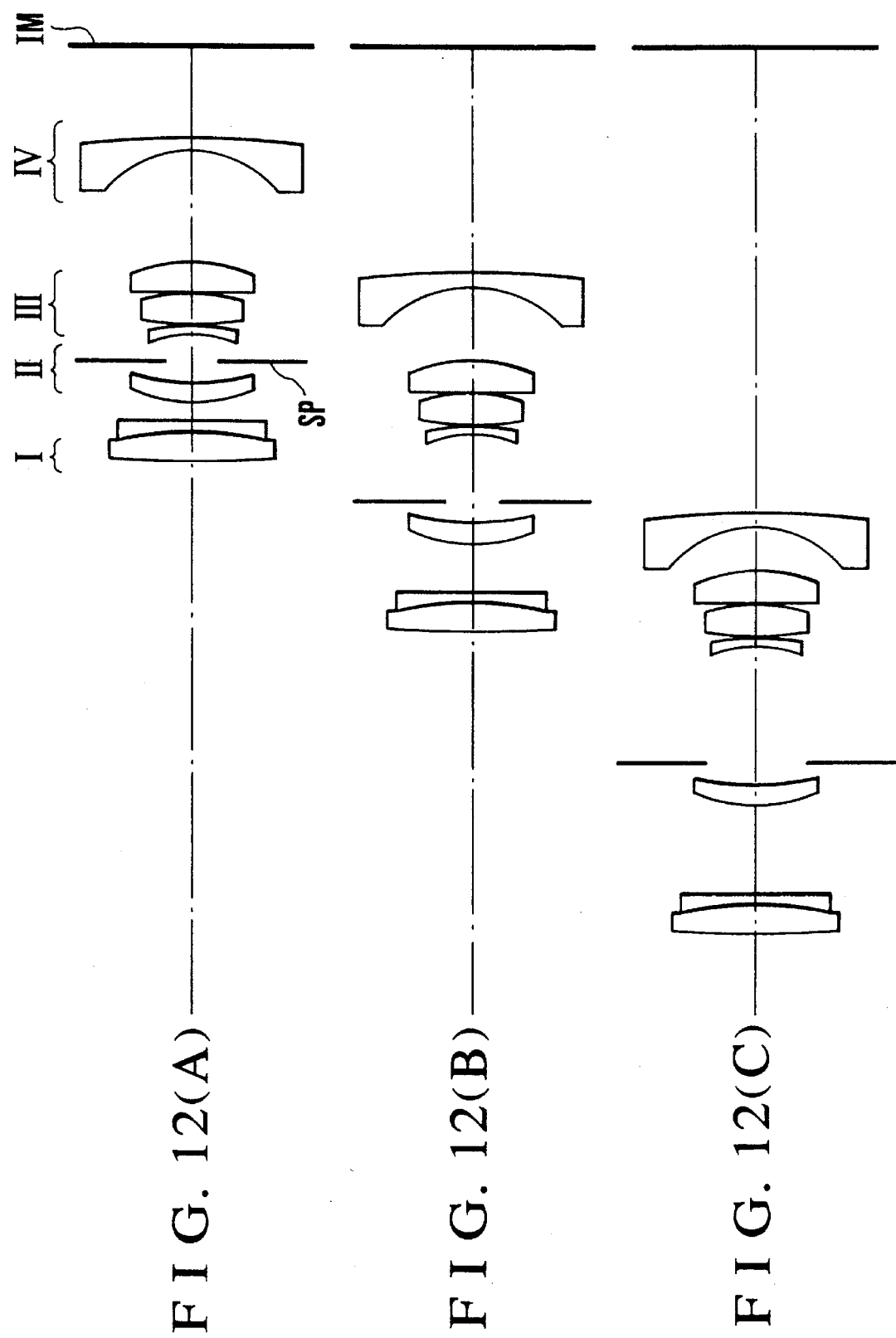
FIGS. 12(A), 12(B) and 12(C) are block diagrams of a numerical example 7 of the zoom lens of the invention.
Figure 14A:
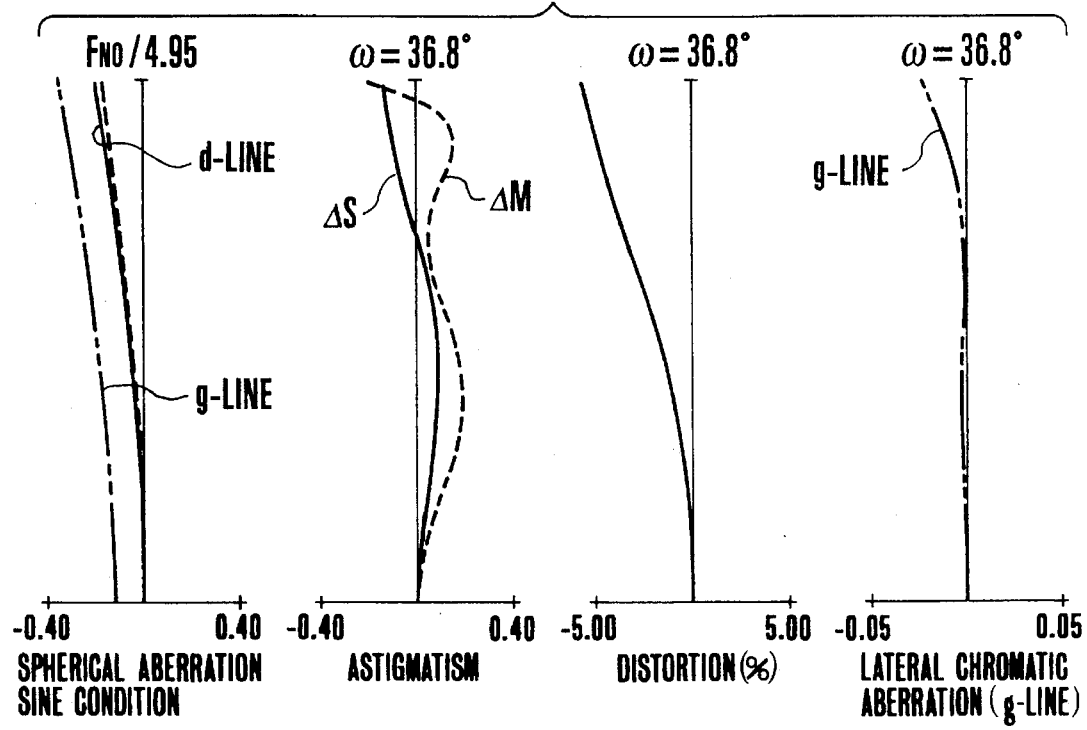
FIGS. 14(A), 14(B) and 14(C) are graphic representations of the various aberrations of the numerical example 6 of the invention.
Figure 14B:
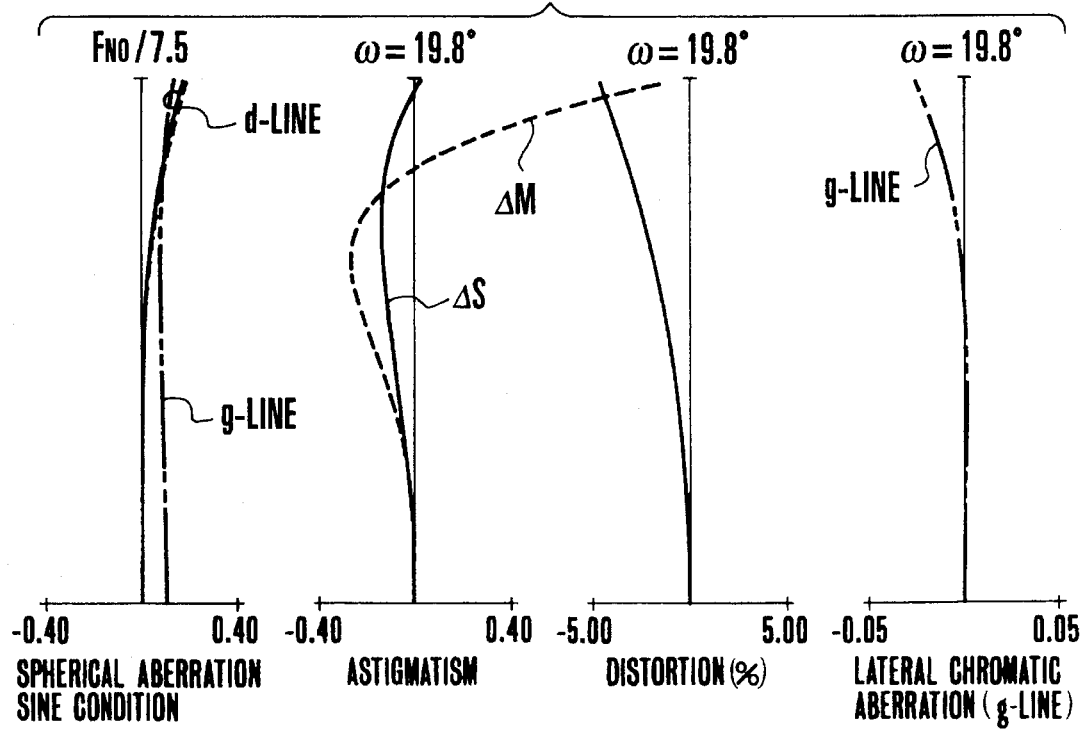
Figure 14C:
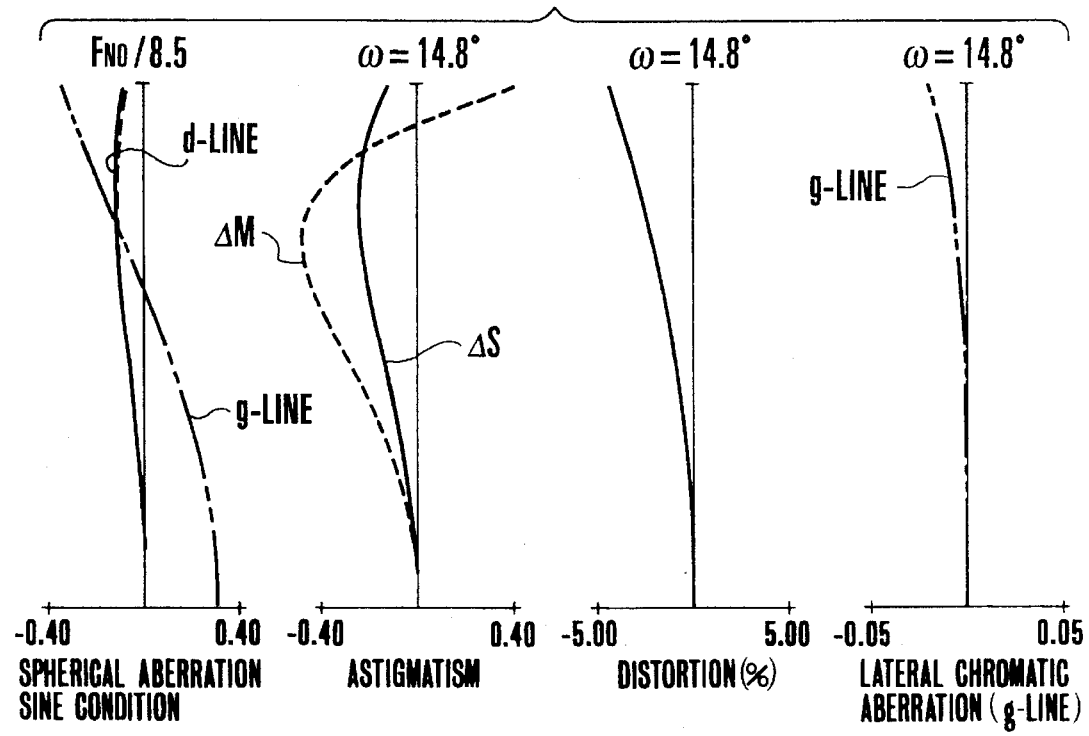
Figure 15A:
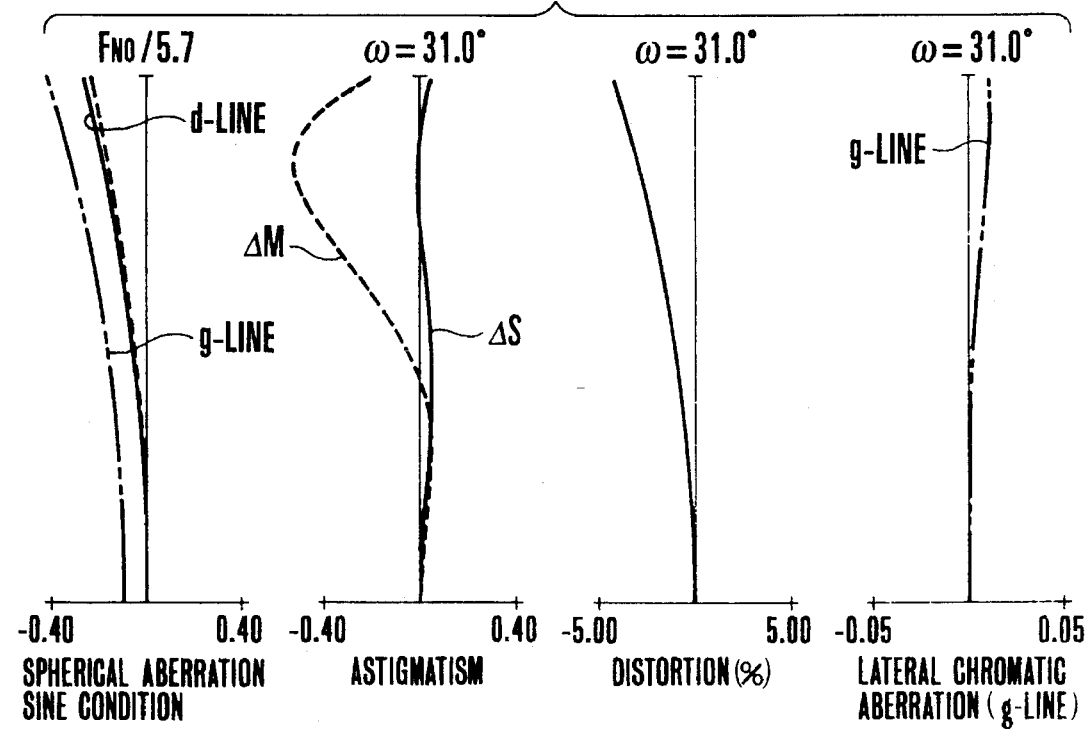
FIGS. 15(A), 15(B) and 15(C) are graphic representations of the various aberrations of the numerical example 7 of the invention.
Figure 15B:
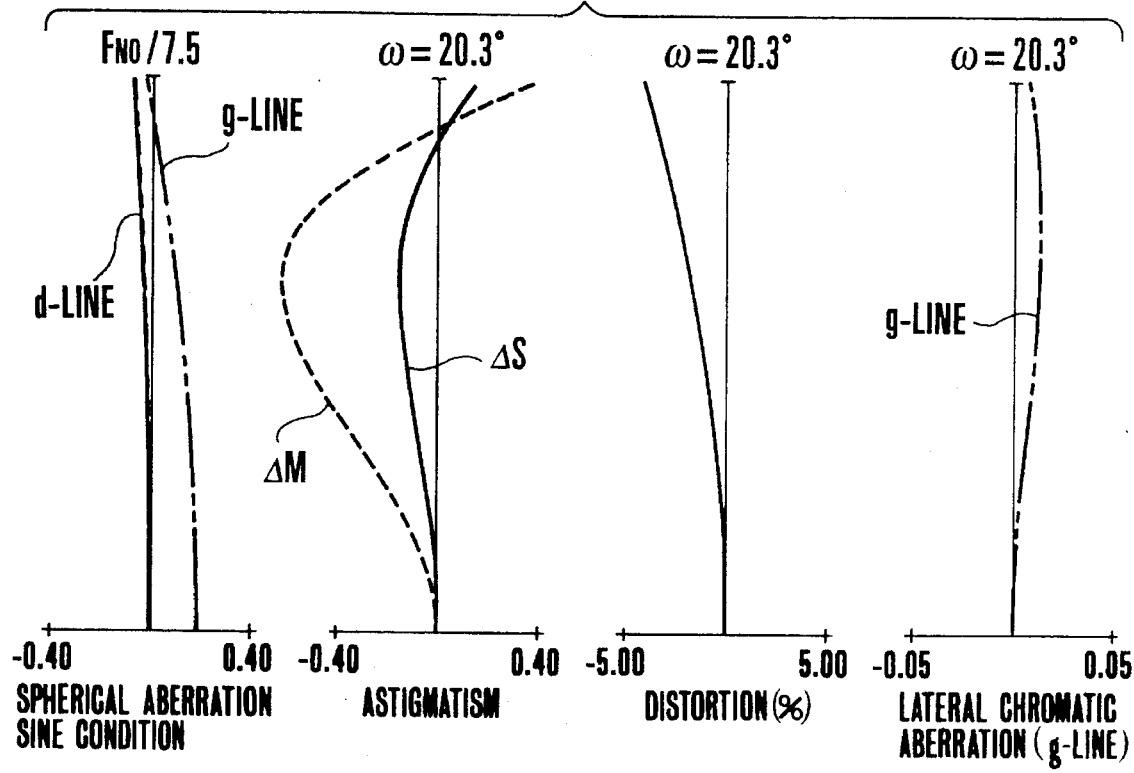
Figure 15C:
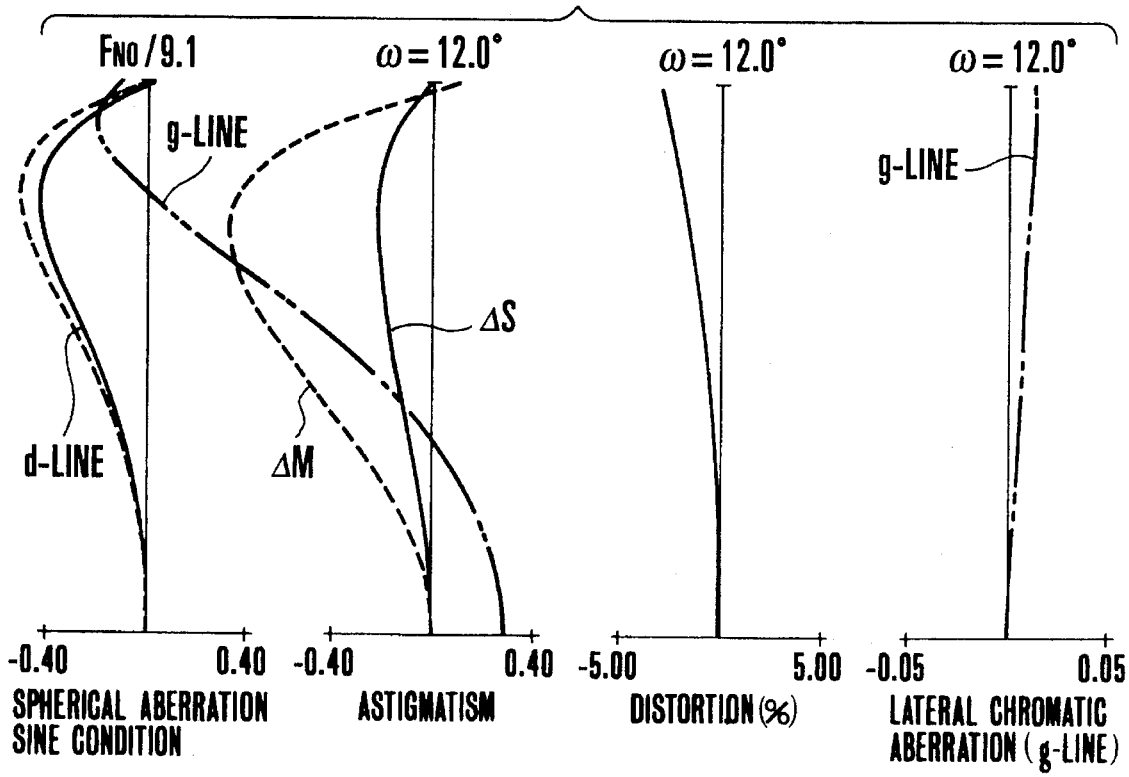
Figure 16A:
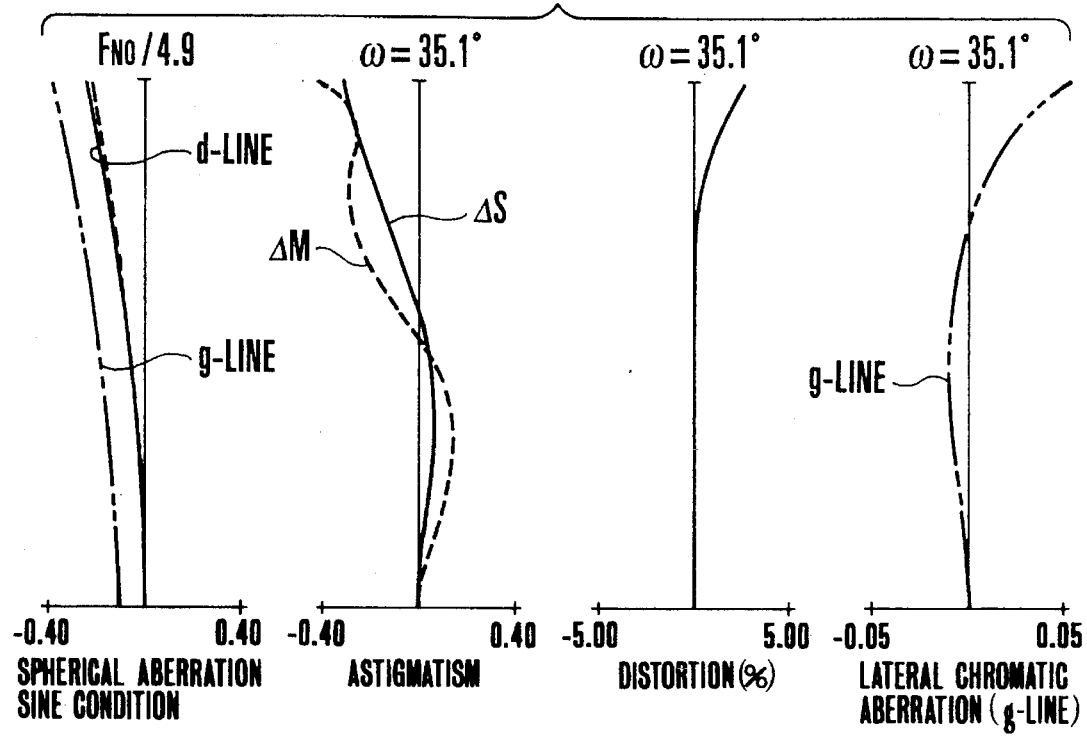
FIGS. 16(A), 16(B) and 16(C) are graphic representations of the various aberrations of the numerical example 8 of the invention.
Figure 16B:
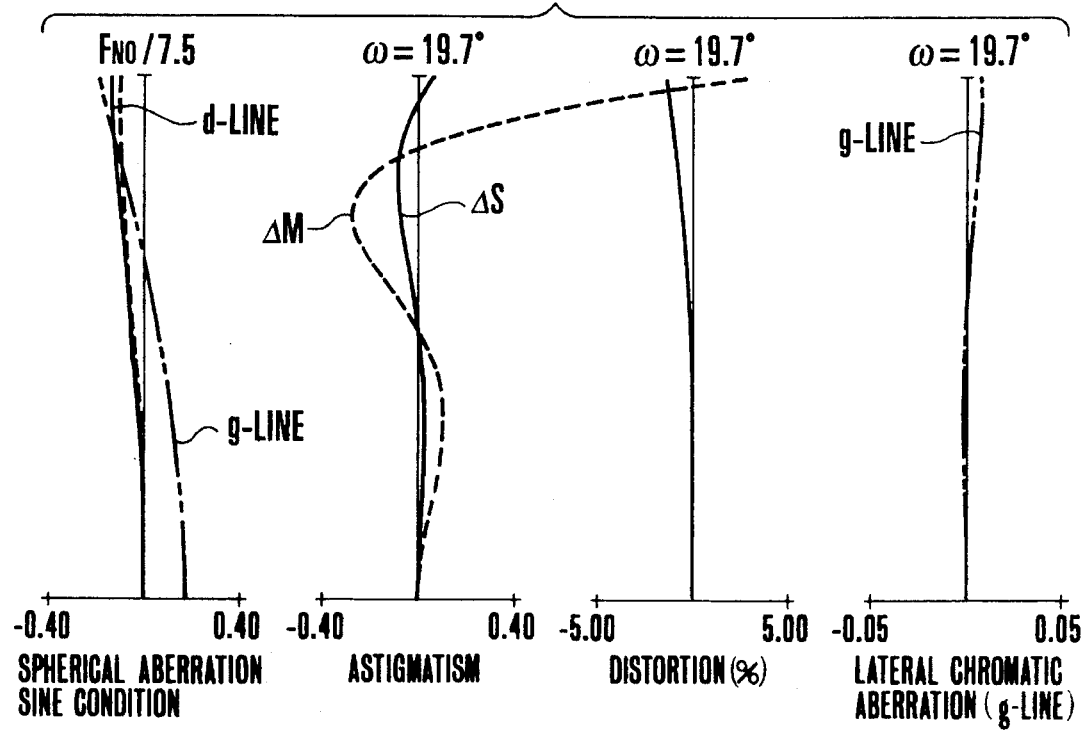
Figure 16C:
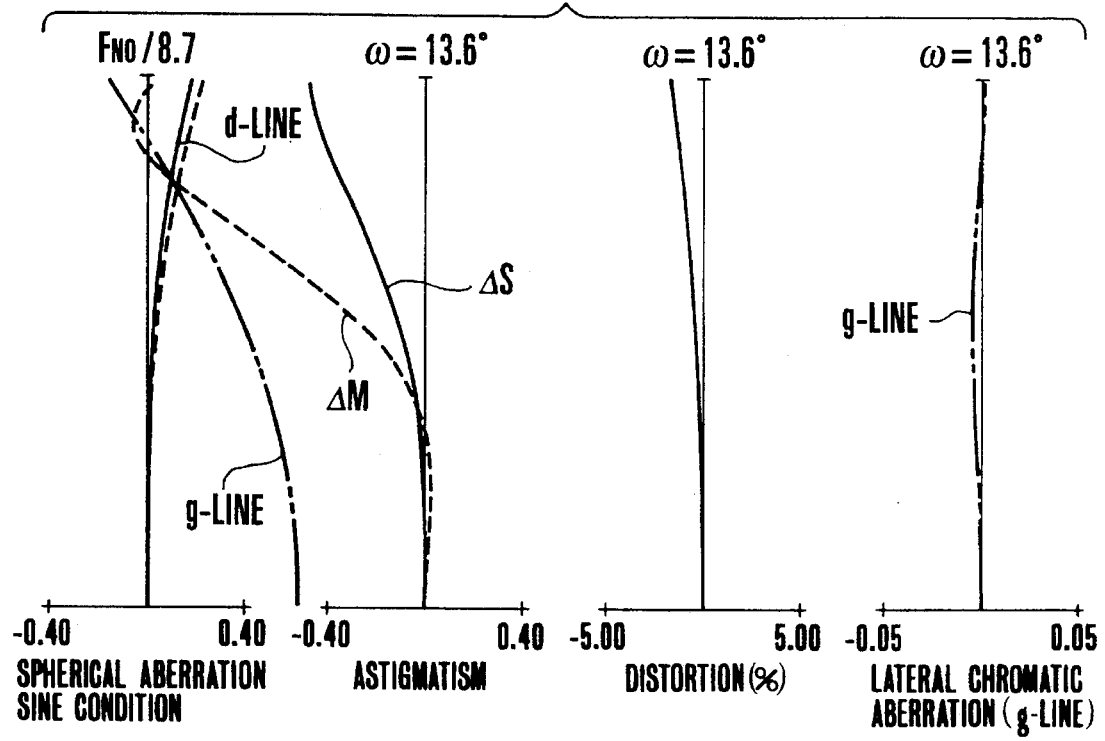

| Inequality of Condition | Numerical Example | |
|---|---|---|
| | 1 | 2 |
| $-3 \times 10^{-2} < hh_{3t}/(f_t - f_w) < 2 \times 10^{-2}$ | $5.83 \times 10^{-3}$ | $3.45 \times 10^{-3}$ |
| $-90 < f_1/f_w < -3.0$ | −13.79 | −16.68 |
| $-0.8 < f_4/f_w < -0.3$ | −0.54 | −0.54 |
| $2.0 < \beta_{4t}/\beta_{4w} < 5.0$ | 2.87 | 2.90 |
| $3.0 \times 10^{-3} < d_{1w}/f_w < 0.2$ | $1.72 \times 10^{-2}$ | $1.72 \times 10^{-2}$ |
| $3 < d_{1t}/d_{1w} < 50$ | 24.54 | 25.30 |
| $2 < d_{2t}/d_{2w} < 10$ | 4.89 | 4.63 |
| $0.1 < (d_{1t} - d_{1w})/f_w < 0.9$ | 0.406 | 0.419 |
| | 3 | 4 |
| $-3 \times 10^{-2} < hh_{3t}/(f_t - f_w) < 2 \times 10^{-2}$ | $3.18 \times 10^{-3}$ | $-2.21 \times 10^{-3}$ |
| $-90 < f_1/f_w < -3.0$ | −13.69 | −4.50 |
| $-0.8 < f_4/f_w < -0.3$ | −0.58 | −0.60 |
| $2.0 < \beta_{4t}/\beta_{4w} < 5.0$ | 2.85 | 3.16 |
| $3.0 \times 10^{-3} < d_{1w}/f_w < 0.2$ | $4.01 \times 10^{-2}$ | $1.72 \times 10^{-2}$ |
| $3 < d_{1t}/d_{1w} < 50$ | 11.39 | 27.18 |
| $2 < d_{2t}/d_{2w} < 10$ | 5.41 | 4.57 |
| $0.1 < (d_{1t} - d_{1w})/f_w < 0.9$ | 0.416 | 0.451 | described by reference to FIGS. 11(A), 11(B) and 11(C) to FIGS. 16(A), 16(B) and 16(C) below.

In this embodiment, the third lens unit is used as the focusing lens, that is, the inner focus method is employed.

It should be noted that the refractive power arrangement to be used is the same and the conditions to be used are the same and have the same ranges as those described before.

In the present embodiment, as it is used as the focusing lens, the third lens unit is arranged to axially move toward the object side, when focusing down to suit from an infinitely distant object to a closest object. Such an inner focus method has a characteristic that the amount of forward movement is larger when on the telephoto side than when on the wide-angle side.

Further, in the present embodiment, unlike the before-described embodiment, the stop SP is fixed to the second lens unit and satisfies the following condition, thereby permitting zooming to be performed with full play of the characteristic of the inner focus method.

That is, letting the air separations for an infinitely distant object between the Fno. stop and the third lens unit in the wide-angle and telephoto ends be denoted by $d_{sw}$ and $d_{st}$, respectively, that condition is expressed by $$d_{st} > 3 \cdot d_{sw}$$

This means that the air separation between the stop and the third lens unit gets so much larger when on the telephoto side that, as zooming to the telephoto end, a long enough space is provided for the focusing movement of the third lens unit. When the range of this inequality of condition is violated, it becomes difficult to focus down to a short enough object distance when on the telephoto side. Therefore, the merit arising from the use of the inner focus method is diminished objectionably.

Next, numerical examples 6 to 8 of the invention are shown. In the numerical examples 6 to 8, the first lens unit is constructed with a bi-convex lens and a negative lens having a concave surface facing the object side, totaling two lens members. The production of chromatic aberrations and spherical aberration is thus suppressed. The second lens unit is constructed with a positive meniscus lens convex toward the object side. The third lens unit is so constructed as to suppress the variation of aberrations with focusing. For this purpose, it comprises, in the order from the object side, a negative meniscus lens concave toward the object side, a bi-convex lens and a positive lens having a convex surface facing the image side, totaling three lens members. The fourth lens unit is constructed with inclusion of a negative lens whose front surface of strong concave curvature is formed to an aspheric shape such that the negative refracting power gets progressively weaker toward the margin, thereby well correcting the off-axial aberrations. Particularly when the fourth lens unit is constructed in the form of only one lens, improvements of the compact form are achieved.

The numerical data for the examples 6 to 8 are listed in the tables below, where Ri is the radii of curvature, Di is the lens surface separations, Ni is the refractive indices, and $\upsilon i$ is the Abbe numbers.

The aspheric surface is expressed by $$x = (y^2/r)/\{1 + \sqrt{1 - (1+k)(y/r)^2}\ \} + Ay^2 + By^4 + Cy^6 + Dy^8 + Ey^{10} + \ldots$$

where A to E are the coefficients.

Also the notations: "e+i" and "e-i" represent $\times 10^i$ and $\times 10^{-i}$, respectively.

The aberration curves of FIGS. 14(A), 14(B) and 14(C) to FIGS. 16(A), 16(B) and 16(C) are of the numerical examples 6 to 8, respectively. The figure numbers suffixed (A) show the wide-angle end, the figure numbers suffixed (B) show a middle focal length position and the figure numbers suffixed (C) show the telephoto end.

NUMERICAL EXAMPLE 6

| f = 28.99–81.90 | Fno = 4.95–8.50 | 2ω = 73.5–29.6 | |
|---|---|---|---|
| R1 = 225.529 | D1 = 3.50 | N1 = 1.487490 | ν1 = 70.2 |
| R2 = −32.259 | D2 = 0.10 | | |
| R3 = −32.785 | D3 = 1.20 | N2 = 1.846659 | ν2 = 23.8 |
| R4 = −181.475 | D4 = Variable | | |
| R5 = 15.377 | D5 = 2.11 | N3 = 1.728249 | ν3 = 28.5 |
| R6 = 27.777 | D6 = 2.63 | | |
| R7 = Stop | D7 = Variable | | |
| R8 = −9.906 | D8 = 1.00 | N4 = 1.834000 | ν4 = 37.2 |
| R9 = −23.415 | D9 = 0.10 | | |
| R10 = 54.730 | D10 = 3.64 | N5 = 1.487490 | ν5 = 70.2 |
| R11 = −13.454 | D11 = 0.10 | | |
| R12 = 189.135 | D12 = 3.26 | N6 = 1.583126 | ν6 = 59.4 |
| *R13 = −16.324 | D13 = Variable | | |
| *R14 = −10.255 | D14 = 2.00 | N7 = 1.665320 | ν7 = 55.4 |
| R15 = −2382.928 | | | |

| Variable | Focal Length | | |
|---|---|---|---|
| Separation | 28.99 | 59.96 | 81.90 |
| D4 | 0.50 | 8.55 | 13.27 |
| D7 | 3.68 | 11.49 | 15.27 |
| D13 | 10.88 | 4.97 | 3.00 |

Aspheric Coefficients:
R13:

| k = −3.16765e + 00 | A = 0 | B = 1.22510e − 05 |
|---|---|---|
| C = 4.52854e − 07 | D = −1.87230e − 09 | E = −1.76970e − 13 |

R14:

k = −6.04346e − 01    A = 0              B = 1.17531e − 04
C = 2.17127e − 07     D = −3.18452e − 09  E = 1.17026e − 11

NUMERICAL EXAMPLE 7

| | | | |
|---|---|---|---|
| f = 36.00–101.53 | Fno = 5.70–9.06 | 2ω = 62.0–24.1 | |
| R1 = 129.613 | D1 = 3.31 | N1 = 1.487490 | v1 = 70.2 |
| R2 = −41.987 | D2 = 0.15 | | |
| R3 = −36.650 | D3 = 1.20 | N2 = 1.846659 | v2 = 23.8 |
| R4 = −442.148 | D4 = Variable | | |
| R5 = 15.233 | D5 = 2.56 | N3 = 1.728249 | v3 = 28.5 |
| R6 = 25.305 | D6 = 2.50 | | |
| R7 = Stop | D7 = Variable | | |
| R8 = −11.940 | D8 = 1.00 | N4 = 1.834000 | v4 = 37.2 |
| R9 = −27.182 | D9 = 0.20 | | |
| R10 = 33.385 | D10 = 3.53 | N5 = 1.487490 | v5 = 70.2 |
| R11 = −19.908 | D11 = 0.10 | | |
| R12 = −195.732 | D12 = 3.50 | N6 = 1.583126 | v6 = 59.4 |
| *R13 = −15.817 | D13 = Variable | | |
| *R14 = −9.897 | D14 = 1.50 | N7 = 1.665320 | v7 = 55.4 |
| R15 −116.419 | | | |

| Variable Separation | Focal Length | | |
|---|---|---|---|
| | 36.00 | 58.37 | 101.53 |
| D4 | 1.78 | 5.03 | 9.48 |
| D7 | 2.85 | 7.38 | 13.12 |
| D13 | 12.10 | 8.06 | 4.76 |

Aspheric Coefficients:
R13:

k = −3.47709e + 00    A = 0              B = −8.39960e − 06
C = −4.78226e − 08    D = 1.24395e − 08   E = −5.55459e − 11

R14:

k = −5.48363e − 01    A = 0              B = 1.19084e − 04
C = −5.86041e − 07    D = 7.76439e − 09   E = −3.09727e − 11

NUMERICAL EXAMPLE 8

| | | | |
|---|---|---|---|
| f = 30.72–89.08 | Fno = 4.90–7.50 | 2ω = 70.3–27.3 | |
| R1 = 112.860 | D1 = 2.88 | N1 = 1.487490 | v1 = 70.2 |
| R2 = −112.456 | D2 = 0.90 | | |
| R3 = −48.688 | D3 = 1.25 | N2 = 1.846659 | v2 = 28.8 |
| R4 = 3922.990 | D4 = Variable | | |
| R5 = 16.449 | D5 = 2.51 | N3 = 1.575006 | v3 = 41.5 |
| R6 = 132.325 | D6 = 2.60 | | |
| R7 = Stop | D7 = Variable | | |
| R8 = −14.719 | D8 = 1.13 | N4 = 1.834000 | v4 = 37.2 |
| R9 = −37.979 | D9 = 0.63 | | |
| R10 = 151.609 | D10 = 2.99 | N5 = 1.487490 | v5 = 70.2 |
| R11 = −41.828 | D11 = 0.63 | | |
| R12 = 38.122 | D12 = 4.90 | N6 = 1.583126 | v6 = 59.4 |
| *R13 = −15.675 | D13 = Variable | | |
| *R14 = −11.298 | D14 = 2.51 | N7 = 1.743198 | v7 = 49.3 |
| R15 = 21159.428 | | | |

| Variable Separation | Focal Length | | |
|---|---|---|---|
| | 30.72 | 60.38 | 89.08 |
| D4 | 0.63 | 9.12 | 15.86 |
| D7 | 2.72 | 9.15 | 11.93 |
| D13 | 11.22 | 4.78 | 2.01 |

Aspheric Coefficients:
R13:

k = −3.97648e + 00    A = 0              B = −3.67218e − 05

-continued

| | | |
|---|---|---|
| C = 6.08182e − 07 | D = −4.14338e − 09 | E = 1.37136e − 11 |
| R14: | | |
| k = −8.30100e − 01 | A = 0 | B = 4.53482e − 05 |
| C = 3.02881e − 07 | D = 5.13003e − 09 | E = 1.58105e − 11 |

Figure 18A:
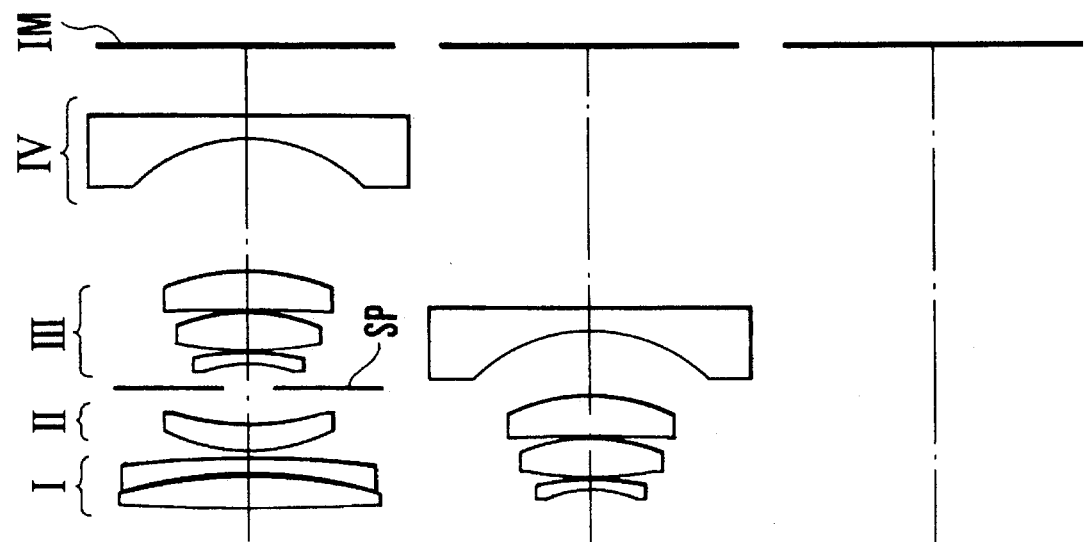
FIGS. 18(A), 18(B) and 18(C) are block diagrams of a numerical example 10 of the zoom lens of the invention.
Figure 18B:
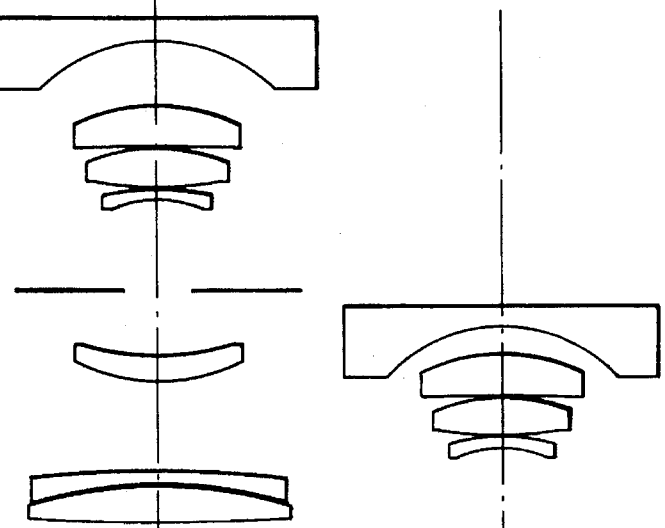
Figure 18C:
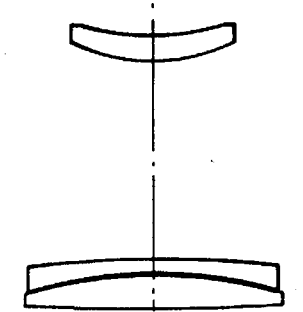
Figures 19A, 19B, 19C:
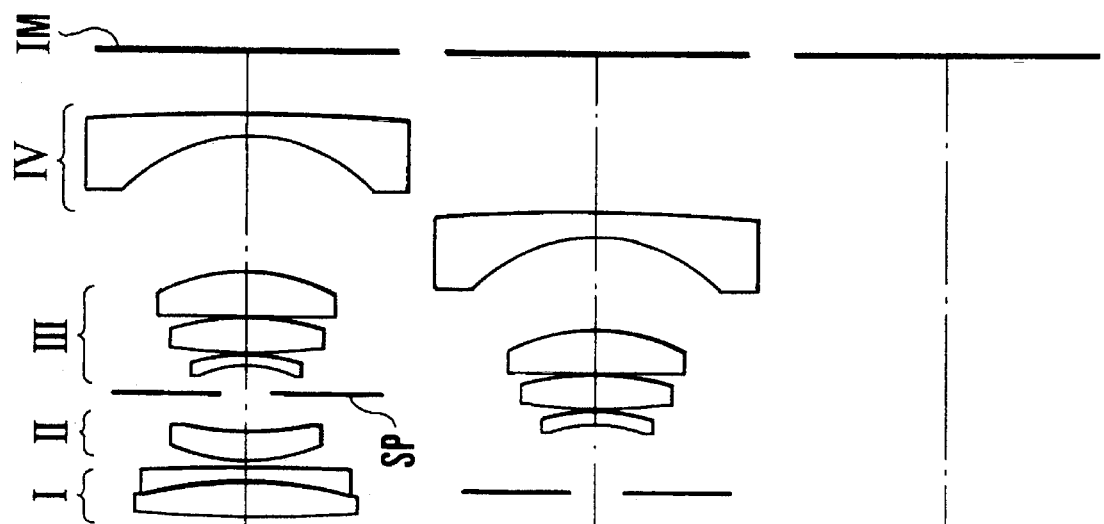
FIGS. 19(A), 19(B) and 19(C) are block diagrams of a numerical example 11 of the zoom lens of the invention.
Figure 20A:
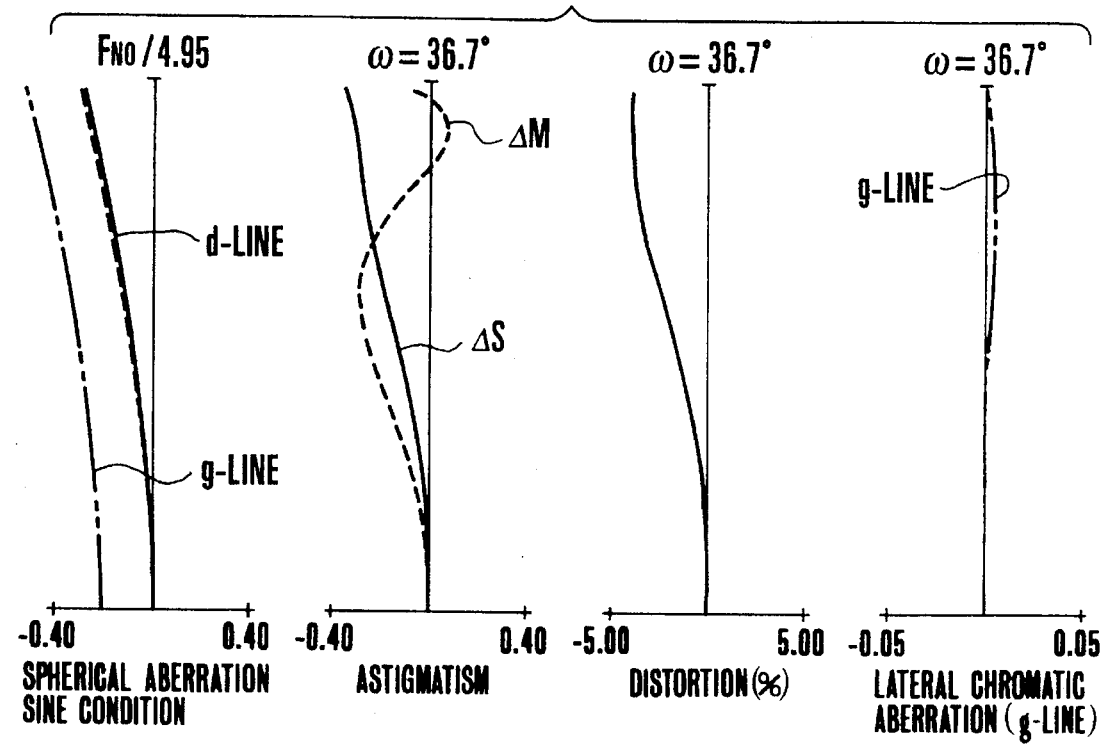
FIGS. 20(A), 20(B) and 20(C) are graphic representations of the various aberrations of the numerical example 9 of the invention.
Figure 20B:
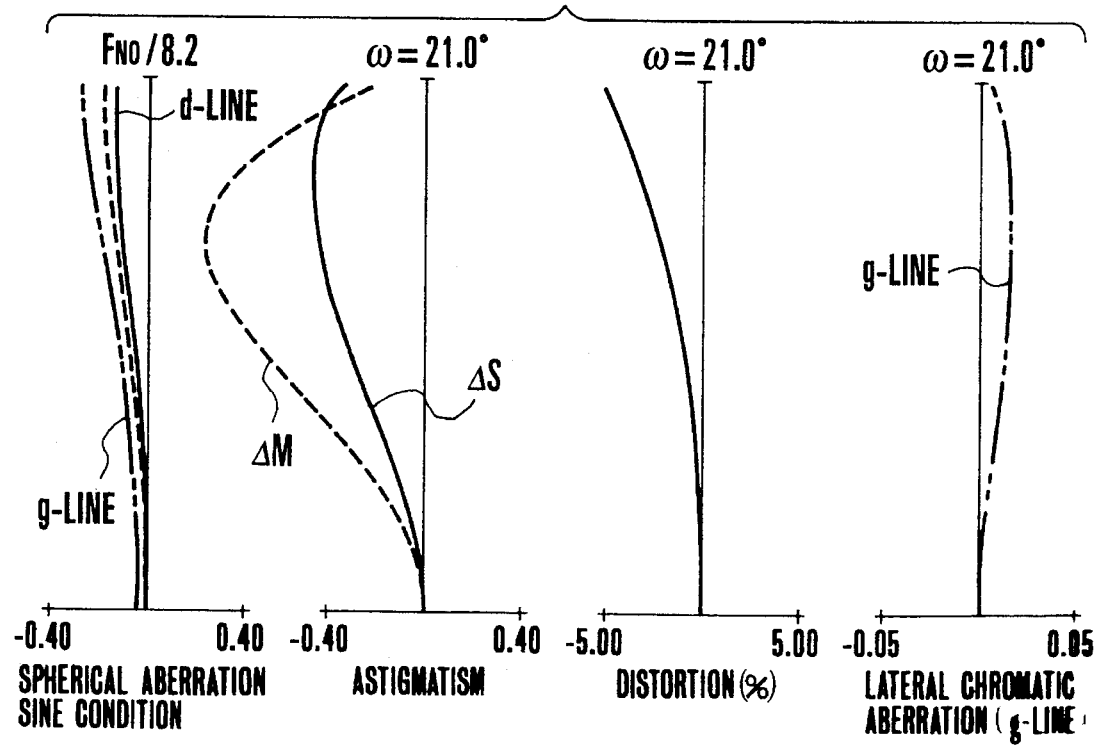
Figure 20C:
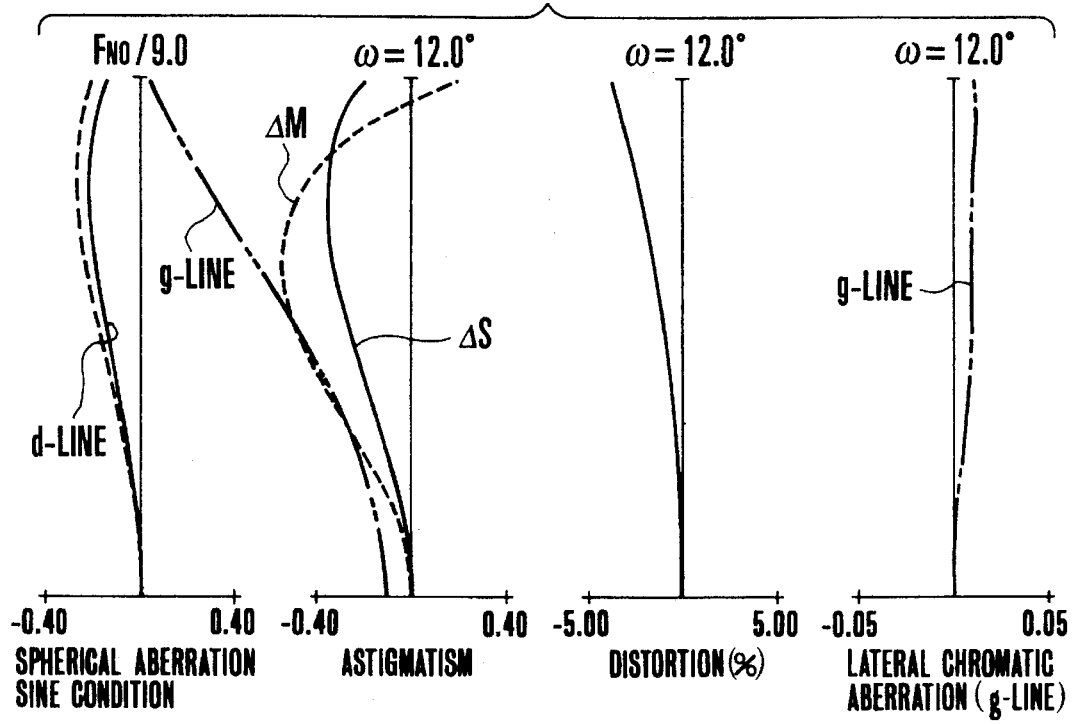
Figure 21A:
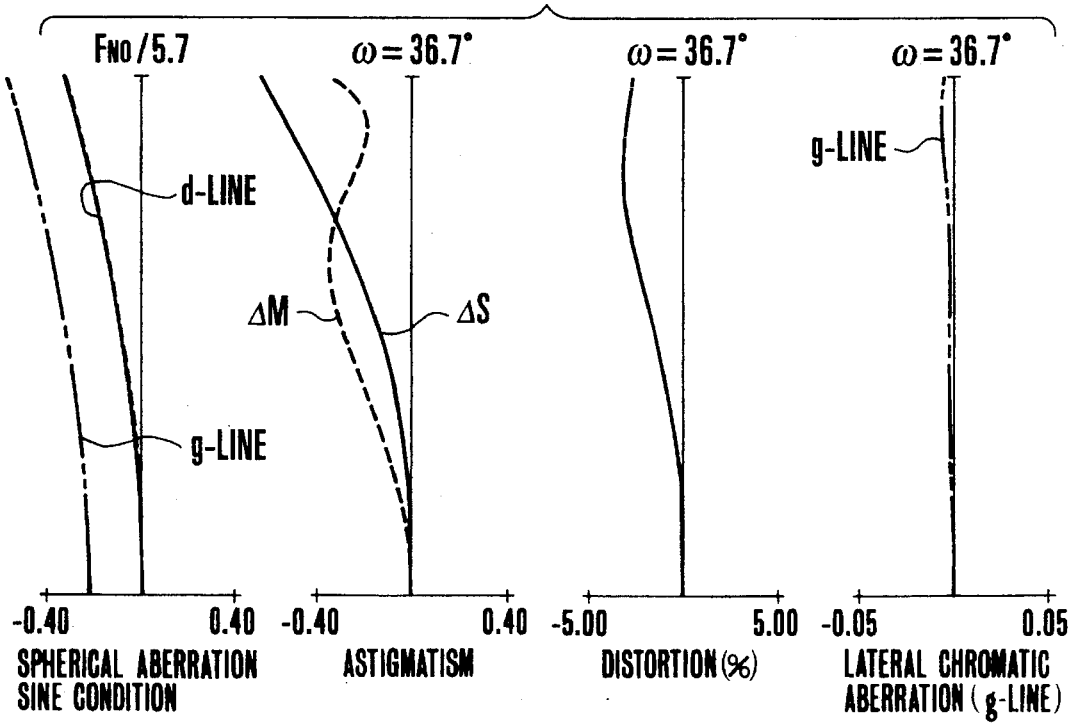
FIGS. 21(A), 21(B) and 21(C) are graphic representations of the various aberrations of the numerical example 10 of the invention.
Figure 21B:
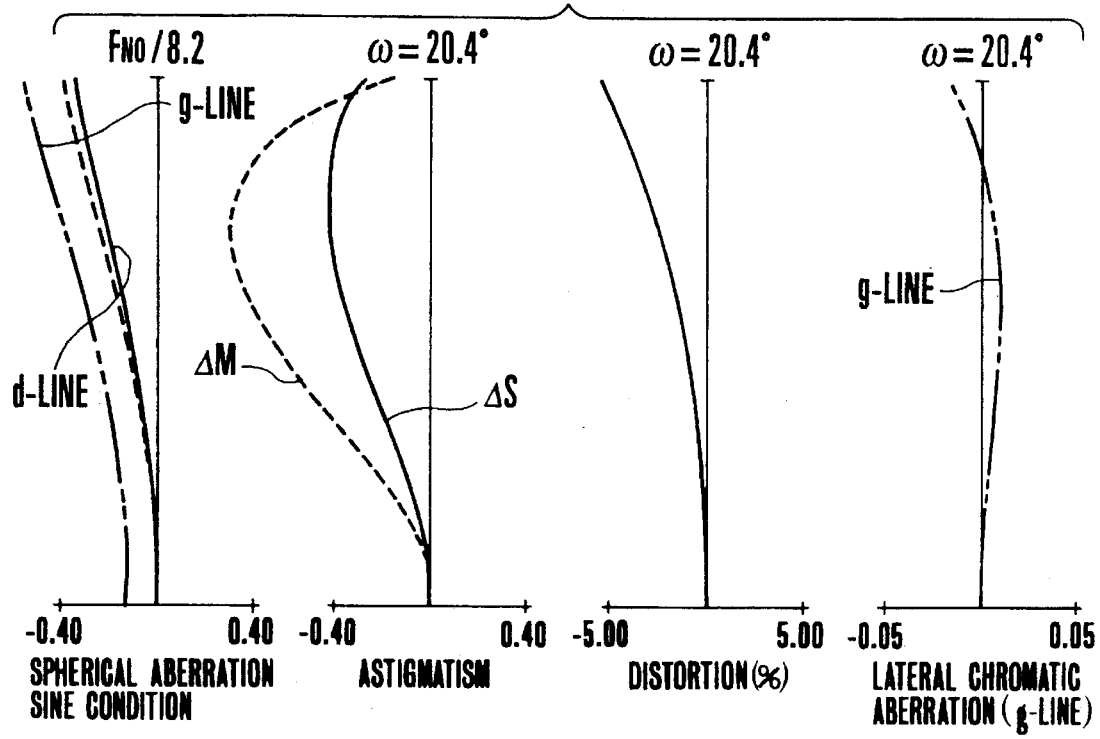
Figure 21C:
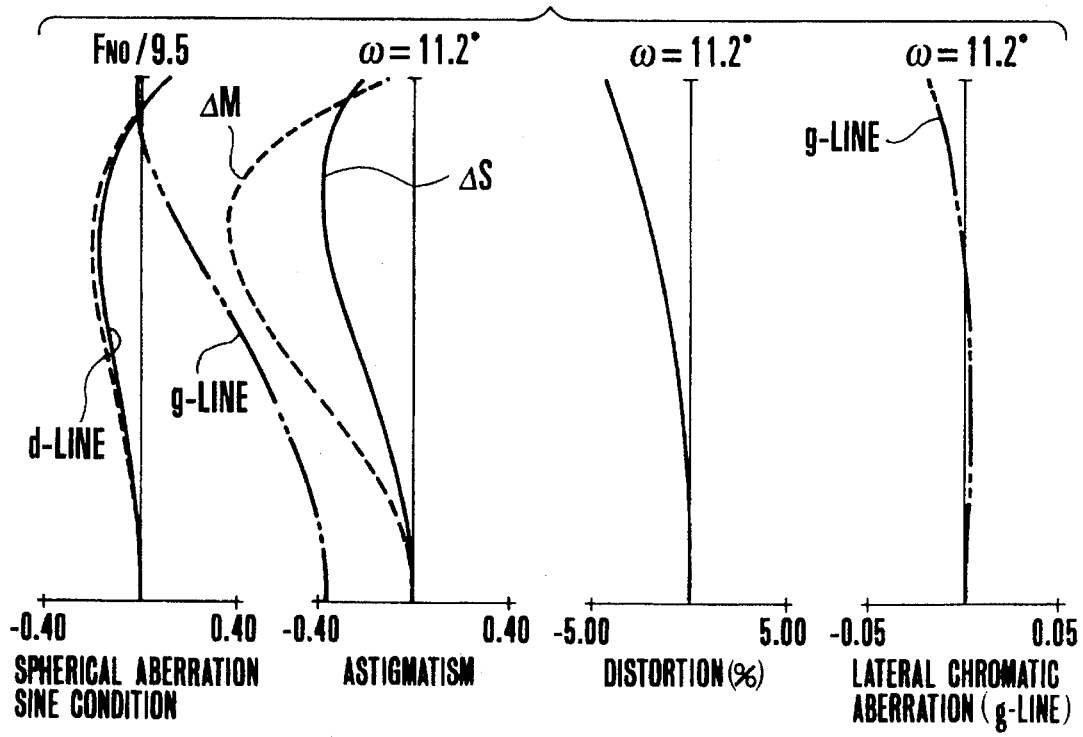
Figure 22A:
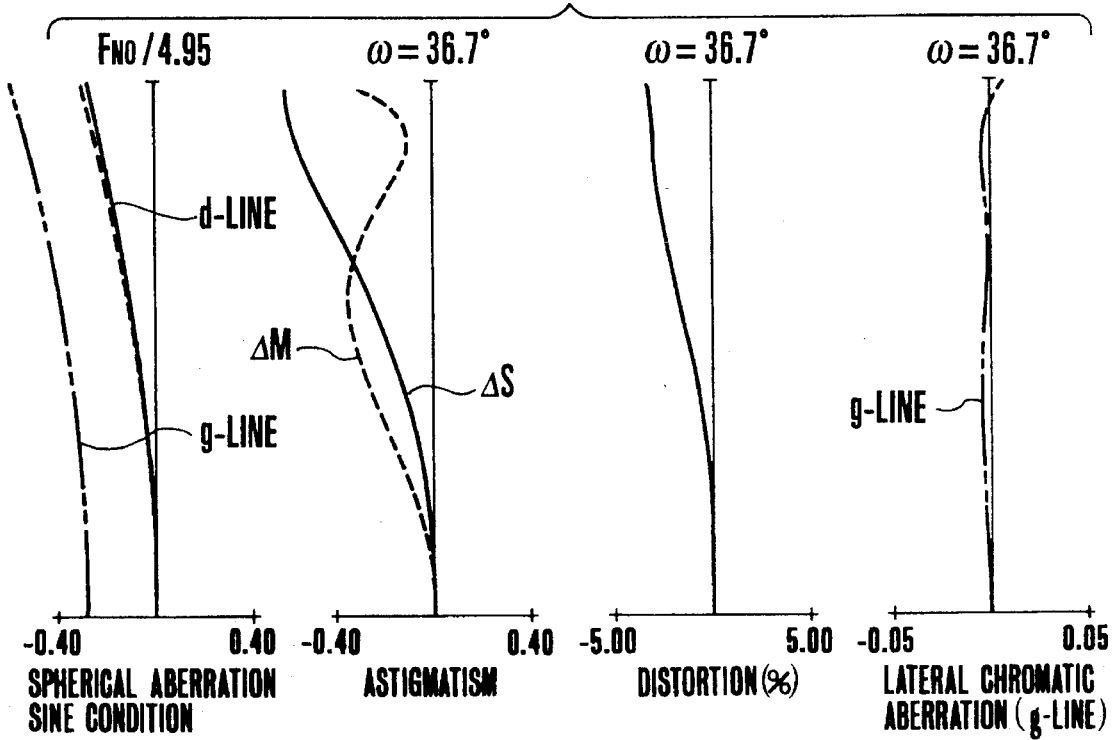
FIGS. 22(A), 22(B) and 22(C) are graphic representations of the various aberrations of the numerical example 11 of the invention.
Figure 22B:
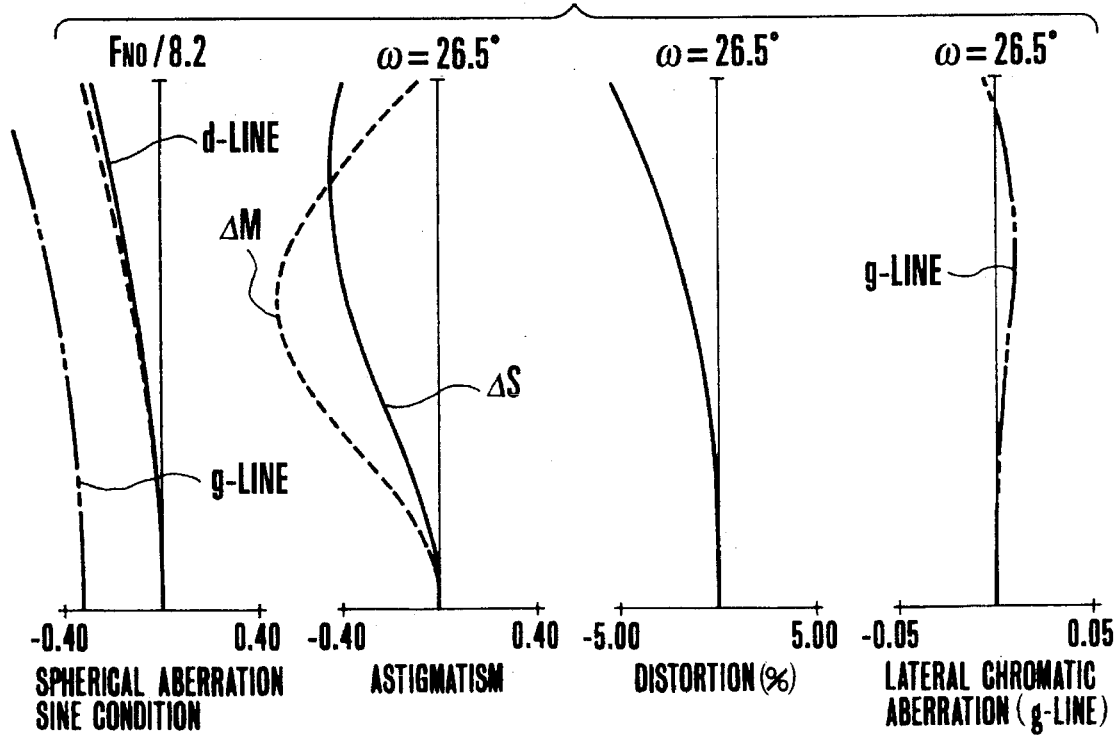
Figure 22C:
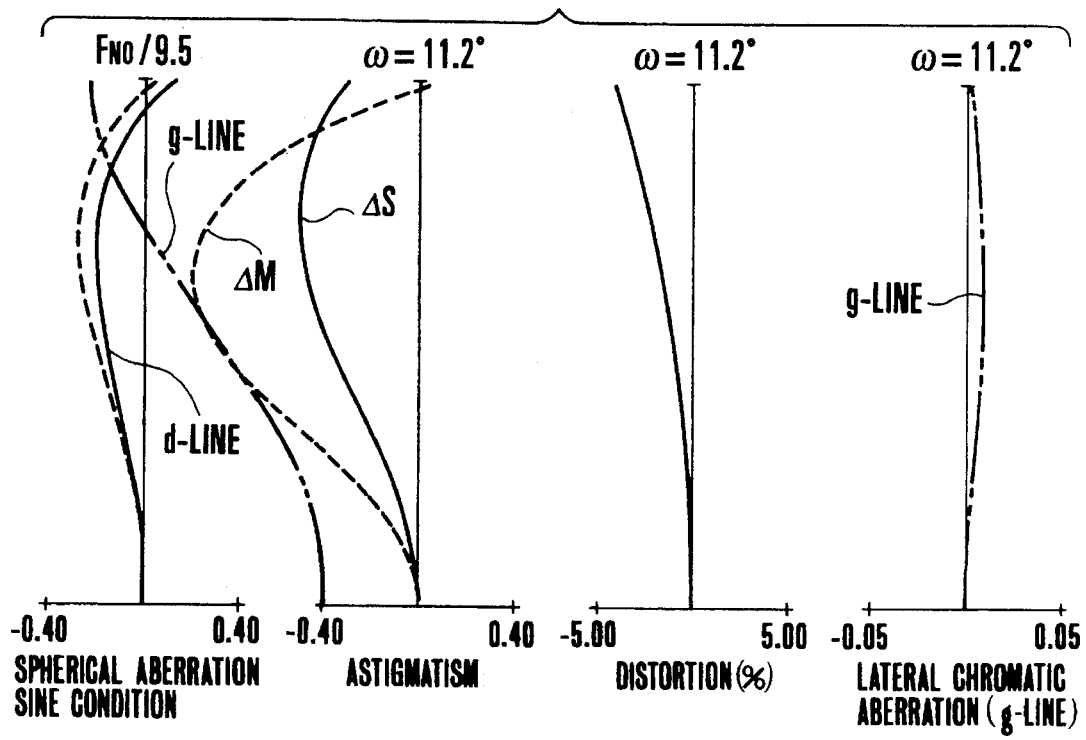

Yet another embodiment of the invention in which further improvements have been made is described by reference to FIGS. 17(A), 17(B) and 17(C) to FIGS. 22(A), 22(B) and 22(C). In the present embodiment, the stop is, on one hand, made to move in unified relation with the fourth lens unit, and the third lens unit is, on the other hand, made to be movable for focusing purposes.

As is understandable from this, in the present embodiment, the stop and the fourth lens unit are, as described above, arranged to move in unison. By employing such an arrangement, these parts are permitted to be assembled in a common unit. This leads to attain successes of simplifying the structure of construction of the mechanical mounting for the lens system and of increasing the productivity in the assembly line.

Another feature of the present embodiment is that the requirements of improving the compact form of the zoom lens and of maintaining good stability of optical performance are fulfilled at once. For this purpose, it is desired to satisfy at least one of inequalities of conditions (a) to (c) described below.

$$0.1 < (d_{1t} - d_{1w})/f_w < 0.9 \ldots \quad (a)$$

where $d_{1w}$: the air separation for the wide-angle end between the first and second lens units;

$d_{1t}$: the air separation for the telephoto end between the first and second lens units; and $f_w$: the shortest focal length of the entire system.

$$2.0 < \beta_{4t}/\beta_{4w} < 5.0 \ldots \quad (b)$$

where $\beta_{4w}$: the magnification for an infinitely distant object of the fourth lens unit in the wide-angle end; and $\beta_{4t}$: the magnification for an infinitely distant object of the fourth lens unit in the telephoto end.

$$d_{st} > 1.2 \cdot d_{sw} \ldots \quad (c)$$

where $d_{sw}$: the air separation for an infinitely distant object between the stop and the third lens unit in the wide-angle end; and $d_{st}$: the air separation for an infinitely distant object between the stop and the third lens unit in the telephoto end.

The technical significance of each of these inequalities of conditions (a) to (c) is explained below.

The inequalities of condition (a) are for regulating the air separation between the first and second lens units. When the upper limit is exceeded, the total length increases largely. Moreover, to secure the corner illumination, the diameter of the first lens unit has to increase objectionably. Conversely when the lower limit is exceeded, this is advantageous at shortening the total length. However, as the fourth lens unit bears a relatively large proportion of the duty of varying the focal length, the first lens unit tends to become difficult to correct the variation of aberrations the fourth lens unit produces. So, it should be avoided.

The inequalities of condition (b) are for regulating the variation of the lateral magnification of the fourth lens unit. When the upper limit is exceeded, as this means that the fourth lens unit contributes to too large a variation of the focal length, it becomes difficult to correct the aberrations which are produced when zooming. Conversely when the lower limit is exceeded, it becomes difficult to obtain a high zoom ratio. If the zoom ratio is given to another lens unit, the lens system tends to increase in size as a whole.

The inequality of condition (c) is for improving the compact form of the zoom lens particularly under the condition that the third lens unit is used for focusing. To explain it in more detail, the present embodiment makes the focusing provision in the third lens unit. At this time, the focusing lens moves toward the object side, as focusing is effected down to suit from an infinitely distant object to an object at the minimum distance. Such an inner focus method has a characteristic that the focusing movement is larger when on the telephoto side than when on the wide-angle side. So, the present embodiment sets forth this inequality of condition. When it is satisfied, the full range of focusing movement can be secured even on the telephoto side. Also on the wide-angle side, the stop approaches the third lens unit. The stop is thus made to take its place near the center of the physical length of the entire system, thereby giving an advantage of achieving improvements of the compact form of the lens system.

As more desired, the ranges of the inequalities of conditions described before may be altered as follows:

$$0.3 < (d_{1t} - d_{1w})/f_w < 0.6 \ldots \quad (a')$$

$$2.5 < \beta_{4t}/\beta_{4w} < 3.5 \ldots \quad (b')$$

$$d_{st} > 2.0 \cdot d_{sw} \ldots \quad (c')$$

Next, numerical examples 9 to 11 of the invention are shown. In the numerical examples 9 to 11, the first lens unit is constructed with a bi-convex lens and a negative lens having a concave surface facing the object side, totaling two lens members. The production of chromatic aberrations and spherical aberration is thus suppressed. The second lens unit is constructed with a positive meniscus lens convex toward the object side. The third lens unit is so constructed as to suppress the variation of aberrations with focusing. For this purpose, the third lens unit comprises, in the order from the object side, a negative meniscus lens concave toward the object side, a bi-convex lens and a positive lens having a convex surface facing the image side, totaling three lens members. The fourth lens unit is constructed with inclusion of a negative lens whose front surface of strong concave curvature is formed to an aspheric shape such that the negative refracting power gets progressively weaker toward the margin, thereby well correcting the off-axial aberrations. Particularly when the fourth lens unit is constructed in the form of only one lens, improvements of the compact form are achieved. It is to be noted that the fourth lens unit of the numerical example 11 is a lens made up in such a way that a resin coating is applied to a spherical lens and then hardened to an aspheric layer.

The numerical data for the examples 9 to 11 are listed in the tables below, where Ri is the radii of curvature, Di is the lens surface separations, Ni is the refractive indices, and $\nu i$ is the Abbe numbers.

The aspheric surface is expressed by $$x = (y^2/r)/\{1 + \sqrt{1 - (1+k)(y/r)^2}\} + Ay^2 + By^4 + Cy^6 + Dy^8 + Ey^{10} + \ldots$$

where A to E are the coefficients.

Also the notations: "e+i" and "e−i" represent $\times 10^i$ and $\times 10^{-i}$ respectively.

The aberration curves of FIGS. 20(A), 20(B) and 20(C) to FIGS. 22(A), 22(B) and 22(C) are of the numerical examples 9 to 11, respectively. The figure numbers suffixed (A) show the wide-angle end, the figure numbers suffixed (B) show a middle focal length position and the figure numbers suffixed (C) show the telephoto end.

NUMERICAL EXAMPLE 9

| | | | |
|---|---|---|---|
| f = 28.99–102.07 | Fno = 4.95–9.0 | 2ω = 73.5–23.9 | |
| R1 = 180.084 | D1 = 3.31 | N1 = 1.487490 | ν1 = 70.2 |
| R2 = −35.781 | D2 = 0.10 | | |
| R3 = −34.579 | D3 = 1.25 | N2 = 1.846659 | ν2 = 23.8 |
| R4 = −129.114 | D4 = Variable | | |
| R5 = 15.101 | D5 = 2.56 | N3 = 1.728249 | ν3 = 28.5 |
| R6 = 22.704 | D6 = Variable | | |
| R7 = Stop | D7 = Variable | | |
| R8 = −10.421 | D8 = 1.13 | N4 = 1.834000 | ν4 = 37.2 |
| R9 = −19.995 | D9 = 0.38 | | |
| R10 = 46.535 | D10 = 3.26 | N5 = 1.487490 | ν5 = 70.2 |
| R11 = −18.390 | D11 = 0.13 | | |
| R12 = 260.225 | D12 = 4.01 | N6 = 1.583126 | ν6 = 59.4 |
| *R13 = −15.684 | D13 = Variable | | |
| *R14 = −11.340 | D14 = 2.01 | N7 = 1.743198 | ν7 = 49.3 |
| R15 = −1674.919 | | | |

| Variable | Focal Length | | |
|---|---|---|---|
| Separation | 28.99 | 56.26 | 102.07 |
| D4 | 0.50 | 7.17 | 16.27 |
| D6 | 3.23 | 4.64 | 7.33 |
| D7 | 3.17 | 8.49 | 11.77 |
| D13 | 11.12 | 5.80 | 2.52 |

Aspheric Coefficients:
R13:

k = −2.62091e + 00      A = 0                  B = −8.67956e − 06
C = 7.13590e − 07       D = −5.15005e − 09     E = −2.20112e − 13

R14:

k = −7.07946e − 01      A = 0                  B = 6.80725e − 05
C = 4.83876e − 07       D = −5.73541e − 09     E = 1.48400e − 11

NUMERICAL EXAMPLE 10

| | | | |
|---|---|---|---|
| f = 29.09–109.41 | Fno = 5.70–9.5 | 2ω = 73.3–22.4 | |
| R1 = 195.669 | D1 = 3.31 | N1 = 1.487490 | ν1 = 70.2 |
| R2 = −39.863 | D2 = 0.16 | | |
| R3 = −37.259 | D3 = 1.20 | N2 = 1.846659 | ν2 = 23.8 |
| R4 = −111.494 | D4 = Variable | | |
| R5 = 16.244 | D5 = 2.56 | N3 = 1.728249 | ν3 = 28.5 |
| R6 = 23.259 | D6 = Variable | | |
| R7 = Stop | D7 = Variable | | |
| R8 = −10.568 | D8 = 1.00 | N4 = 1.834000 | ν4 = 37.2 |
| R9 = −19.878 | D9 = 0.15 | | |
| R10 = 39.180 | D10 = 3.51 | N5 = 1.487490 | ν5 = 70.2 |
| R11 = −16.607 | D11 = 0.13 | | |
| R12 = −115.296 | D12 = 3.76 | N6 = 1.583126 | ν6 = 59.4 |
| *R13 = −15.250 | D13 = Variable | | |
| *R14 = −10.597 | D14 = 2.01 | N7 = 1.665320 | ν7 = 55.4 |
| R15 = −607.286 | | | |

| Variable | Focal Length | | |
|---|---|---|---|
| Separation | 29.09 | 58.30 | 109.41 |
| D4 | 0.50 | 7.88 | 17.66 |
| D6 | 3.24 | 6.03 | 10.06 |

|  | -continued | | |
|---|---|---|---|
| D7 | 2.91 | 8.74 | 12.34 |
| D13 | 11.96 | 6.13 | 2.53 |

Aspheric Coefficients:
R13:

k = −3.65112e + 00   A = 0          B = −5.47628e − 05
C = 1.29847e − 06    D = −9.17269e − 09   E = 4.43356e − 12

R14:

k = −5.72769e − 01   A = 0          B = 8.49100e − 05
C = 7.24403e − 07    D = −7.58132e − 09   E = 2.20266e − 11

NUMERICAL EXAMPLE 11

| f = 29.09–109.59 | Fno = 5.75–9.5 | 2ω = 73.3–22.3 | |
|---|---|---|---|
| R1 = 107.683 | D1 = 3.31 | N1 = 1.487490 | v1 = 70.2 |
| R2 = −37.723 | D2 = 0.10 | | |
| R3 = −36.465 | D3 = 1.25 | N2 = 1.846659 | v2 = 23.8 |
| R4 = −199.544 | D4 = Variable | | |
| R5 = 16.566 | D5 = 2.56 | N3 = 1.740769 | v3 = 27.8 |
| R6 = 25.961 | D6 = Variable | | |
| R7 = Stop | D7 = Variable | | |
| R8 = −10.615 | D8 = 1.13 | N4 = 1.882997 | v4 = 40.8 |
| R9 = −17.252 | D9 = 0.19 | | |
| R10 = 51.259 | D10 = 3.26 | N5 = 1.487490 | v5 = 70.2 |
| R11 = −23.833 | D11 = 0.13 | | |
| R12 = −369.812 | D12 = 4.01 | N6 = 1.583126 | v6 = 59.4 |
| *R13 = −14.375 | D13 = Variable | | |
| *R14 = −10.361 | D14 = 0.13 | N7 = 1.524210 | v7 = 51.4. |
| R15 = −14.923 | D15 = 1.88 | N8 = 1.804000 | v8 = 46.6 |
| R16 = −164.429 | | | |

| Variable | Focal Length | | |
|---|---|---|---|
| Separation | 29.09 | 43.38 | 109.59 |
| D4 | 0.50 | 3.31 | 14.28 |
| D6 | 3.51 | 4.64 | 9.34 |
| D7 | 2.91 | 6.55 | 12.39 |
| D13 | 12.00 | 8.37 | 2.53 |

Aspheric Coefficients:
R13:

k = −1.01199e + 00   A = 0          B = 1.90059e − 05
C = 8.20044e − 07    D = −7.36515e − 09   E = −7.16646e − 13

R14:

k = −1.08274e + 00   A = 0          B = 6.67839e − 05
C = 7.53885e − 07    D = −8.83717e − 09   E = 2.60189e − 11

As has been described above, according to the invention, a zoom lens of which the total angular field is very wide, for example, 73.5 degrees, and the zoom ratio is as high as, for example, 3.5 to 4, is achieved. In addition, a high optical performance is realized over the entire zooming range, while still permitting extreme improvements of the compact form to be achieved.

What is claimed is:

1. A zoom lens comprising, from front to rear, a first lens unit having a negative refractive power, a second lens unit having a positive refractive power, a third lens unit having a positive refractive power and a fourth lens unit having a negative refractive power, wherein zooming from a wide-angle end to a telephoto end is performed in such a manner that an air separation between said first lens unit and said second lens unit increases, an air separation between said second lens unit and said third lens unit increases and an air separation between said third lens unit and said fourth lens unit decreases.

2. A zoom lens according to claim 1, wherein focusing is performed by moving said third lens unit.

3. A zoom lens according to claim 1, further comprising a stop positioned in a space between said second lens unit and said third lens unit.

4. A zoom lens according to claim 3, wherein said stop is fixed to said third lens unit.

5. A zoom lens according to claim 1, satisfying the following condition:

$$-3\times 10^{-2} < hh_{3t}/(f_t-f_w) < 2\times 10^{-2}$$

where $f_w$: the shortest focal length of the entire system;
$f_t$: the longest focal length of the entire system; and
$hh_{3t}$: the interval between principal points of said third lens unit and said fourth lens unit in the telephoto end.

6. A zoom lens according to claim 1, satisfying the following condition:

$$0.1 < (d_{1t} - d_{1w})/f_w < 0.9$$

where
- $f_w$: the shortest focal length of the entire system;
- $d_{1w}$: the air separation between said first lens unit and said second lens unit in the wide-angle end; and
- $d_{1t}$: the air separation between said first lens unit and said second lens unit in the telephoto end.

7. A zoom lens according to claim 1, satisfying the following condition:

$$3.0 \times 10^{-3} < d_{1w}/f_w < 0.2$$

where
- $f_w$: the shortest focal length of the entire system; and
- $d_{1w}$: the air separation between said first lens unit and said second lens unit in the wide-angle end.

8. A zoom lens according to claim 1, satisfying the following condition:

$$3 < d_{1t}/d_{1w} < 50$$

where
- $d_{1w}$: the air separation between said first lens unit and said second lens unit in the wide-angle end; and
- $d_{1t}$: the air separation between said first lens unit and said second lens unit in the telephoto end.

9. A zoom lens according to claim 1, satisfying the following condition:

$$2 < d_{2t}/d_{2w} < 10$$

where
- $d_{2w}$: the air separation between said second lens unit and said third lens unit in the wide-angle end; and
- $d_{2t}$: the air separation between said second lens unit and said third lens unit in the telephoto end.

10. A zoom lens according to claim 1, satisfying the following condition:

$$-90 < f_1/f_w < -3$$

where
- $f_1$: the focal length of said first lens unit; and
- $f_w$: the shortest focal length of the entire system.

11. A zoom lens according to claim 1, satisfying the following condition:

$$-0.8 < f_4/f_w < -0.3$$

where
- $f_4$: the focal length of said fourth lens unit; and
- $f_w$: the shortest focal length of the entire system.

12. A zoom lens according to claim 1, satisfying the following condition:

$$2.0 < \beta_{4t}/\beta_{4w} < 5.0$$

where
- $\beta_{4w}$: the magnification for an infinitely distant object of said fourth lens unit in the wide-angle end; and
- $\beta_{4t}$: the magnification for the infinitely distant object of said fourth lens unit in the telephoto end.

13. A zoom lens according to claim 1, further comprising a stop fixed to said second lens unit.

14. A zoom lens according to claim 3, wherein said stop is arranged to move in unison with said fourth lens unit during zooming.

15. A zoom lens according to claim 1, wherein said second lens unit moves in unison with said fourth lens unit during zooming.

16. A zoom lens comprising, from front to rear, a first lens unit of negative refractive power, a second lens unit of positive refractive power, a third lens unit of positive refractive power and a fourth lens unit of negative refractive power, wherein, when zooming from a wide-angle end to a telephoto end, said lens units are made to move in such relation that an air separation between said first lens unit and said second lens unit increases and an air separation between said third lens unit and said fourth lens unit decreases, and wherein focusing is performed by moving said third lens unit.

17. A zoom lens comprising, from front to rear, a first lens unit of negative refractive power, a second lens unit of positive refractive power, a third lens unit of positive refractive power and a fourth lens unit of negative refractive power, wherein, when zooming from a wide-angle end to a telephoto end, said lens units are made to move in such relation that an air separation between said first lens unit and said second lens unit increases and an air separation between said third lens unit and said fourth lens unit decreases, and wherein focusing is performed by moving all said lens units in unison.

18. A zoom lens comprising, from front to rear, a first lens unit of negative refractive power, a second lens unit of positive refractive power, a third lens unit of positive refractive power and a fourth lens unit of negative refractive power, wherein, when zooming from a wide-angle end to a telephoto end, said lens units are made to move in such relation that an air separation between said first lens unit and said second lens unit increases and an air separation between said third lens unit and said fourth lens unit decreases, and wherein said fourth lens unit has at least one aspheric surface.

19. A zoom lens comprising, from front to rear, a first lens unit of negative refractive power, a second lens unit of positive refractive power, a third lens unit of positive refractive power and a fourth lens unit of negative refractive power, wherein, when zooming from a wide-angle end to a telephoto end, said lens units are made to move in such relation that an air separation between said first lens unit and said second lens unit increases and an air separation between said third lens unit and said fourth lens unit decreases, and wherein said third lens unit includes at least one positive lens having an aspheric surface and at least one negative lens.

20. A zoom lens according to any one of claims 16 to 18, wherein said third lens unit has at least one aspheric surface.

21. A zoom lens according to any one of claims 16 to 19, wherein said first to fourth lens units, during zooming, all move toward an object side.

22. A zoom lens according to any one of claims 16 to 19, wherein said third lens unit has a stop included therein.

23. A zoom lens according to any one of claims 16 to 19, wherein a frontmost lens in said fourth lens unit is a negative lens.

24. A zoom lens according to claim 18, wherein said fourth lens unit is constructed with a single lens of negative refractive power whose front surface is formed to aspheric such that the negative refracting power gets progressively weaker toward the margin.

25. A zoom lens according to any one of claims 16 to 19, satisfying the following condition:

$$-3 \times 10^{-2} < hh_{3t}/(f_t - f_w) < 2 \times 10^{-2}$$

where
$f_w$: the shortest focal length of the entire system;
$f_t$: the longest focal length of the entire system; and
$hh_{3t}$: the interval between principal points of said third lens unit and said fourth lens unit in the telephoto end.

26. A zoom lens according to any one of claims 16 to 19, satisfying the following condition:

$$0.1 < (d_{1t} - d_{1w})/f_w < 0.9$$

where
$f_w$: the shortest focal length of the entire system;
$d_{1w}$: the air separation between said first lens unit and said second lens unit in the wide-angle end; and
$d_{1t}$: the air separation between said first lens unit and said second lens unit in the telephoto end.

27. A zoom lens according to any one of claims 16 to 19, satisfying the following condition:

$$3.0 \times 10^{-3} < d_{1w}/f_w < 0.2$$

where
$f_w$: the shortest focal length of the entire system; and
$d_{1w}$: the air separation between said first lens unit and said second lens unit in the wide-angle end.

28. A zoom lens according to any one of claims 16 to 19, satisfying the following condition:

$$3 < d_{1t}/d_{1w} < 50$$

where
$d_{1w}$: the air separation between said first lens unit and said second lens unit in the wide-angle end; and
$d_{1t}$: the air separation between said first lens unit and said second lens unit in the telephoto end.

29. A zoom lens according to any one of claims 16 to 19, satisfying the following condition:

$$2 < d_{2t}/d_{2w} < 10$$

where
$d_{2w}$: an air separation between said second lens unit and said third lens unit in the wide-angle end; and
$d_{2t}$: an air separation between said second lens unit and said third lens unit in the telephoto end.

30. A zoom lens according to any one of claims 16 to 19, satisfying the following condition:

$$-90 < f_1/f_w < -3$$

where
$f_1$: the focal length of said first lens unit; and
$f_w$: the shortest focal length of the entire system.

31. A zoom lens according to any one of claims 16 to 19, satisfying the following condition:

$$-0.8 < f_4/f_w < -0.3$$

where
$f_4$: the focal length of said fourth lens unit; and
$f_w$: the shortest focal length of the entire system.

32. A zoom lens according to any one of claims 16 to 19, satisfying the following condition:

$$2.0 < \beta_{4t}/\beta_{4w} < 5.0$$

where
$\beta_{4w}$: the magnification for an infinitely distant object of said fourth lens unit in the wide-angle end; and
$\beta_{4t}$: the magnification for the infinitely distant object of said fourth lens unit in the telephoto end.

* * * * *

UNITED STATES PATENT AND TRADEMARK OFFICE
CERTIFICATE OF CORRECTION

PATENT NO. : 5,587,840
DATED : December 24, 1996
INVENTOR(S) : YOSHINORI ITOH

It is certified that error appears in the above-indentified patent and that said Letters Patent is hereby corrected as shown below:

COLUMN 14

Table 1, "Inequaliy" should read --Inequality--.

COLUMN 22

Numerical Example 9, "B = 6.80725e-05" should read --B = 6.80723e-05--.

Signed and Sealed this

First Day of July, 1997

Attest:

BRUCE LEHMAN

Attesting Officer

Commissioner of Patents and Trademarks